US009203999B2

(12) United States Patent
Imai

(10) Patent No.: US 9,203,999 B2
(45) Date of Patent: Dec. 1, 2015

(54) FUNCTION RESTRICTION RELEASE SYSTEM OF ELECTRONIC APPARATUS, FUNCTION RESTRICTION RELEASE METHOD OF ELECTRONIC APPARATUS, AND ELECTRONIC APPARATUS

(71) Applicant: SEIKO EPSON CORPORATION, Tokyo (JP)

(72) Inventor: Shuichi Imai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 43 days.

(21) Appl. No.: 13/770,254

(22) Filed: Feb. 19, 2013

(65) Prior Publication Data

US 2013/0215446 A1 Aug. 22, 2013

(30) Foreign Application Priority Data

Feb. 20, 2012 (JP) ................................. 2012-033805

(51) Int. Cl.
  *G06F 15/00* (2006.01)
  *G06K 1/00* (2006.01)
  *G06F 3/12* (2006.01)
  *H04N 1/00* (2006.01)
  *H04N 1/44* (2006.01)

(52) U.S. Cl.
  CPC ......... *H04N 1/00875* (2013.01); *H04N 1/4426* (2013.01); *H04N 1/4433* (2013.01); *H04N 2201/0094* (2013.01)

(58) Field of Classification Search
  None
  See application file for complete search history.

(56) References Cited

U.S. PATENT DOCUMENTS

| 2002/0105666 A1* | 8/2002 | Sesek ........................... 358/1.14 |
| 2002/0165971 A1* | 11/2002 | Baron ........................... 709/228 |
| 2005/0057408 A1* | 3/2005 | Asakura et al. ............... 343/711 |
| 2006/0015734 A1* | 1/2006 | Atobe ........................... 713/176 |
| 2007/0124436 A1* | 5/2007 | Shepherd ..................... 709/223 |
| 2007/0226808 A1* | 9/2007 | Uchikawa ...................... 726/27 |
| 2010/0277756 A1* | 11/2010 | Merriam ..................... 358/1.15 |
| 2011/0026065 A1* | 2/2011 | Bard et al. .................. 358/1.14 |
| 2011/0063670 A1* | 3/2011 | Ito ............................... 358/1.15 |

FOREIGN PATENT DOCUMENTS

| JP | 05-124304 A | 5/1993 |
| JP | 05-173735 A | 7/1993 |
| JP | 2005-020126 A | 1/2005 |
| JP | 2006-239923 A | 9/2006 |
| JP | 2008-033415 A | 2/2008 |

* cited by examiner

*Primary Examiner* — Ming Hon
(74) *Attorney, Agent, or Firm* — Global IP Counselors, LLP

(57) ABSTRACT

It can confirm candidates of functional parts that can be selected as a function restriction release target, and can select the functional parts of the function restriction release target prior to receiving a release code. A mobile terminal sends registration information, which includes a MAC address acquired from a multifunction device, to a server. An authentication process of the compound device is performed in the server. After that, an additional function selection screen is displayed in the mobile terminal based on the data sent from the server. The user controls the mobile terminal to select additional functions and to send additional function selection information, and a payment process is performed for the server. The release code is sent from the server to the mobile terminal. The multifunction device releases the function restriction of the corresponded functional parts based on the release code.

10 Claims, 10 Drawing Sheets

| Functions | Release Codes |
|---|---|
| Scanner | x x x x x x x x x x x |
| Copy | x x x x x x x x x x x |
| Fax | x x x x x x x x x x x |
| USB Communications | x x x x x x x x x x x |
| Card Communications | x x x x x x x x x x x |
| Browser | x x x x x x x x x x x |
| E-Mail | x x x x x x x x x x x |

FUNCTION RESTRICTION RELEASE SYSTEM OF ELECTRONIC APPARATUS, FUNCTION RESTRICTION RELEASE METHOD OF ELECTRONIC APPARATUS, AND ELECTRONIC APPARATUS

CROSS-REFERENCE TO RELATED APPLICATIONS

This application claims priority to Japanese Patent Application No. 2012-033805 filed on Feb. 20, 2012. The entire disclosure of Japanese Patent Application No. 2012-033805 is hereby incorporated herein by reference.

BACKGROUND

1. Technical Field

The present invention relates to a function restriction release system of an electronic apparatus, a function restriction release method of an electronic apparatus, and an electronic apparatus, and it is capable of releasing a function restriction of functional parts in an electronic apparatus equipped with at least one functional part in which an execution of a function is restricted.

2. Background Technology

A multifunction device is well known as one example of various types of electronic device. The multifunction device includes a plurality of functional parts such as a scanner functional part, a print functional part, a copy functional part, and a facsimile functional part. By the way, in hotels or community facilities, it is conceivable to provide the multifunction device which is available for a fee to unspecified number of users. In this case, for example, a usage of the functional parts such as a copy functional part and a facsimile functional part are available for a fee, and an execution of these functional parts is restricted so that it is necessary to have a configuration such that when the predetermined procedures are completed, the functional restriction of the functional parts is released for their use.

For example, Patent Document 1 discloses that an image processing apparatus (multifunction device) includes a setting means and an administrator sets release conditions to release function restriction. When the release conditions are met with a request for processing functions from a public user, the restriction release information that temporary release the functional restriction is generated and the functional restriction is released based on the restriction release information.

Also, Patent Document 2 discloses that in addition to the basic functions of the copy function and the print function, an image processing device includes a scanning function which is restricted, and the function restriction of the scanning function can be released. A user purchases a memory medium (e.g., CD-ROM), and the function restriction release program stored in the memory medium is installed in a host PC. When the function restriction release program is activated in the host PC and the host PC and the image processing device are connected, it automatically releases the function restriction of the scanning function in the image processing device.

Also, in Patent Document 3, a user inputs an user registration and an authentication information to a product key issuing server from a PC (personal computer) and when it is authenticated as the user, a product key management information (release code, and the like) is issued and it is written in the information storage device. When the information storage device is connected to the multifunction device (information processing device), the information storage device performs the authentication process of the multifunction device based on the authentication information. When it recognizes the authentication information is legitimate, the user inputs to select a desired function in the multifunction device. When it is requested, the external storage device performs to release the function by using the product key.

Japanese Laid-open Patent Publication No. 2010-251926 (Patent Document 1), Japanese Laid-open Patent Publication No. 2004-32403 (Patent Document 2) and Japanese Laid-open Patent Publication No. 2006-202017 (e.g., paragraphs [0042] to [0048], FIG. 1, FIG. 2, FIG. 6, FIG. 7, and the like) (Patent Document 3) are examples of the related art.

SUMMARY

Problems to be Solved by the Invention

By the way, in Patent Documents 1 to 3, the user who authorized to use the restricted function can use the function by releasing the function restriction. However, in Patent Document 1, it is necessary the administrator to set the release conditions every time the user applies for a use so that it is not suitable as a system that is used by unspecified number of users in hotels and community facilities. Also, in the image processing device described in Patent Document 2, it is necessary to purchase the memory medium which stores the function restriction release program (e.g., CD-ROM), and the function restriction release program has to be installed in the host device. Also, in the same manner, in the information processing device (multifunction device) described in Patent Document 3, the product key management information issued from the server is stored in the information storage device from the PC, and it is necessary to connect the information storage device to the multifunction device (information processing device). Because of this, in Patent Documents 2 and 3, a memory medium (information storage device) is required and a PC (host device) is required when writing the function restriction release program in a memory medium or when writing the product key management information into the information storage device.

However, when the PC is provided in the hotels and the community facilities, it is necessary to perform an approval process for a use of the PC. The approval procedure for the function restriction release process of the multifunction device becomes complicated. For example, it is not necessary to install the PC if the user uses a mobile terminal such as own cellular phone (e.g., smart phone). However, it is desirable to minimize the capacity of the received data as much as possible because the memory capacity of the mobile terminal is relatively small. For example, in Patent Document 2, it is necessary to receive the function restriction release program, and if there is a configuration that the mobile terminal receives it instead of the memory medium, it is necessary to receive the function restriction release program having a relatively large data capacity. Also, Patent Document 3 has a configuration that the user inputs to select the function for a use in the multifunction device that was connected with the external storage device which stores the product key management information so that if there is a configuration that the mobile terminal receives it instead of the external storage device, it is required to receive the relatively large data capacity of the product key management information from the server for not only the function that the user uses but also all possible functions that the user uses. Also, it can consider having a configuration that instead of the mobile terminal, the multifunction device directly receives the function restriction release program or the product key management information from the server, but the memory capacity of the multifunction device is also relatively small so that there is the same problem in this configuration.

By the way, it is not limited to use the multifunction device in the hotels or the community facilities. For example, in a condition that at least one of the functional parts is restricted in the multifunction device, the user purchases a product key of the selected functional part among the restricted functional parts and releases the function restriction. However, the same problem can occur in this configuration. Also, this problem is not limited to the multifunction device and it can be widely applied to electronic apparatuses that are possible to release a function restriction of at least one of the functional parts in which an execution of the functions is restricted.

The invention is made in view of the above problems. In an electronic apparatus having functional parts in which an execution of the functions is restricted, one of the advantages is to provide a function restriction release system of an electronic apparatus, a function restriction release method of an electronic apparatus, and an electronic apparatus. It can confirm candidates of the functional parts which can be selected as a functional restriction release target, and can preliminary select a functional part of the functional restriction release target before receiving a release code.

Means Used to Solve the Above-Mentioned Problems

To achieve one of the above advantages, as a point, one aspect of the invention is a function restriction release system of an electronic apparatus including: an electronic apparatus that includes at least one of functional parts in which an execution of functions is restricted, a display part that displays candidates of the functions that can be selected as a function restriction release target among the functions, a selection part that allows a selection operation of at least one of the functions among the candidates of the functions displayed in the display part and acquires a function selection information, a transmitter that sends the function selection information acquired in the selection part and a device-specific information of the electronic apparatus to a server, a receiver that receives a release code, which is releasable for the restricted function of the functional part for the function restriction release target specified from the function selection information in the electronic apparatus corresponding to the device-specific information, from the server, and a operation part that releases the function restriction of the functional part for the function restriction release target based the release code.

In the above configuration, when the selection part allows the selection operation of at least one of functions among the functions displayed as the candidates that can be selected for a function restriction release target in the display part, the function selection information acquired by the selection part is sent to the server by the transmitter. Also, the device-specific information of the electronic apparatus is sent to the server before, after, or at the same time of sending the function selection information. And, as a response from the server, the receiver receives a release code that is releasable for the function restriction of the functional parts specified from the function selection information in the electronic apparatus corresponding to the device-specific information. The operation part releases the restriction of the functional parts for the functional restriction release target based on the release code. Thus, the user can confirm the candidates of the functions that can be selected as a function restriction release target in the display part and it is possible to receive the release code from the server after selecting the desired function among the candidates of the functions. For example, it is not required to receive any additional information from the server other than the release code corresponding to the selected function.

It is preferable that the function restriction release system of the electronic apparatus according to one aspect of the invention includes an electronic apparatus that includes at least one of functional parts in which an execution of functions is restricted, a display part that displays candidates of functions that can be selected as a function restriction release target among the above functions, a selection part that allows a selection operation of at least one of the functions among the candidates of the functions displayed in the display part and acquires a function selection information, a transmitter that sends the function selection information acquired in the selection part and a device-specific information of the electronic apparatus to a server, a receiver that receives a release code, which is releasable for the function restriction of the functional parts for the function restriction release target specified from the function selection information in the electronic apparatus corresponding to the device-specific information, from the server, a operation part that releases the function restriction of the functional parts for the function restriction release target based on the release code, and the server, wherein the server includes a server receiver that receives the function selection information and the device-specific information, a judgment part that judges whether or not the electronic apparatus is a device for releasing the function restriction of the functional parts based on the device-specific information, and a server transmitter that sends the above release code, which is releasable for the restriction function of the functional parts for the function restriction release target specified in the function selection information, when it was judged that this is the electronic apparatus for releasing the function restriction.

In the above configuration, when the selection part allows the selection operation of at least one of the functions among the functions displayed in the display part as a candidate that can be selected as a function restriction release target, the function selection information acquired by the selection part is sent to the server by the transmitter. Also, the device-specific information of the electronic apparatus is sent to the server by the transmitter before, after or at the same time of sending the function selection information. The server receives the function selection information and the device-specific information in the server receiver. At least after receiving the device-specific information, the judgment part judges whether or not this is the electronic apparatus for releasing the function restriction of the functional parts based on the device-specific information. When it was judged that this is the electronic apparatus for releasing the function restriction, at least after the judgment and after receiving the function selection information, the server transmitter sends the release code which is releasable for the function restriction of the functional parts specified in the function selection information in the electronic apparatus corresponding to the device-specific information. The receiver receives the release code from the server. The operation part releases the function restriction of the functional parts for the function restriction release target based on the release code. Thus, the user can confirm the candidates of the functions that can be selected as a function restriction release target in the display part and it is possible to receive the release code from the server after selecting the desired function among the candidates of the functions. For example, it is not required to receive any additional information from the server other than the release code corresponding to the selected function.

The function restriction release system of the electronic apparatus according to one aspect of the invention includes the electronic apparatus and a mobile terminal that is available for a wireless communication with the electronic apparatus. It is preferable that the display part, the selection part, the transmitter, and the receiver are respectively provided in the electronic apparatus and the mobile terminal.

In the above described configuration, the function restriction release system includes the electronic apparatus and the mobile terminal that is available for the wireless communication with the electronic apparatus. And, the display part, the selection part, the transmitter, and the receiver are respectively provided in the electronic element and the mobile terminal. Thus, it becomes possible that the user uses the mobile terminal to release the function restriction of the functional parts selected as the function restriction release target in the electronic apparatus.

The function restriction release system of the electronic apparatus according to one aspect of the invention includes the electronic apparatus and a wireless communication part that is available for the wireless communication with the mobile terminal. The operation part controls the wireless communication part to limit a possible communication area within a predetermined range from the electronic apparatus, and it is preferable to search mobile terminals, which are existed in the predetermined range, by the wireless.

In the above described configuration, the possible communication area of the wireless communication part is limited in the predetermined range from the electronic apparatus by controlling the operation part so that the mobile terminals existed in the limited predetermined range are searched by the wireless. Because of this, when the user moves the mobile terminal to get closer to a position in the predetermined range for the electronic apparatus, the communication between the mobile terminals that one plans to use and the electronic apparatus can be automatically established.

In the function restriction release system of the electronic apparatus according to one aspect of the invention, it is preferable that the operation part reports an address of the server, which should be accessed, to the searched mobile terminal. In the above described configuration, the address of server that should be accessed is reported to the mobile terminal from the electronic apparatus so that the mobile terminal can connect to the server by accessing to the reported address.

In the function restriction release system of the electronic apparatus according to one aspect of the invention, it has a configuration that the operation part sends the device-specific information to the searched mobile terminal by the wireless of the wireless communication part. The mobile terminal includes at least the display part, the selection part and the transmitter, and it is preferable that the transmitter of the mobile terminal sends the function selection information and the device-specific information to the server.

According to the above configuration, by the operation part, the device-specific information for the searched mobile terminal is sent by the wireless of the wireless communication part. When the selection part of the mobile terminal allows the selection of the functions for the function restriction release target among the functions as the candidate of the function restriction release target displayed in the display part of the mobile terminal, the transmitter of the mobile terminal sends the function selection information and the device-specific information to the server. Because of this, when the user moves the mobile terminal to get closer to the electronic apparatus in a distance of the predetermined range, the mobile terminal can automatically acquire the device-specific information, which should be sent to the server, from the electronic apparatus.

In the function restriction release system of the electronic apparatus according to one aspect of the invention, the function restriction release system is configured by the electronic apparatus, and it is preferable that the electronic apparatus includes the display part, the selection part, the transmitter, the receiver and the operation part.

According to the above configuration, the electronic apparatus includes the display part, the selection part, the transmitter, the receiver, and the operation part so that the candidates of the functions that can be selected as a function restriction release target is displayed in the display part of the electronic apparatus and when the selection part allows to select the functions of the function restriction release target among them, the function selection information is sent from the transmitter of the electronic apparatus to the server. Also, the device-specific information of the electronic apparatus is sent to the server by the transmitter before, after, or at the same time of sending the function selection information. And, when the receiver of the electronic apparatus receives the release code from the server, the function restriction of the functional part for the function restriction release target is released by the operation part of the electronic apparatus based on the release code. Thus, without using the mobile terminal, the function restriction of the functional part that was selected as the function restriction release target can be released in the electronic apparatus. Also, the user can confirm the candidates of the functions that can be selected as the function restriction release target in the display part, and the release code can be sent from the server after selecting a desired function among the candidates of the functions.

In the function restriction release system of the electronic apparatus according to one aspect of the invention, the candidates of the functional parts are configured by a software part, the functional parts are connected to a hardware part to realize the functions, the operation of the hardware part is restricted by interrupting the electric power supply from the power supply part, the operations of the functional parts are restricted based on program, the operation part releases the function restriction of the functional parts for the function restriction release target based on the program, and by controlling the power supply part, it is preferable to release the function restriction of the hardware part by supplying electric power to the hardware part corresponding to the functional parts.

According to the above configuration, the power supply part is controlled by the operation part and the power supplies to the hardware part connected to the functional parts for the function restriction release target to realize the functions so as to release the function restriction. With that, the function restriction of the functional parts is released based on the program. Thus, before releasing the function restriction, the power supply to the hardware part is interrupted during the function restriction so that it contributes the power saving of the electronic apparatus compares to the configuration that the power supplies to the hardware part during the function restriction.

In the function restriction release system of the electronic apparatus according to one aspect of the invention, as the functional parts, the electronic apparatus includes at least two of a scanning function part, a printing function part, a copying function part, and a facsimile function part. In the initial state of the electronic apparatus, it is preferable that least one of the at least two functional parts is restricted as a candidate that can be selected as the function restriction release target.

According to the above configuration, in the initial state of the electronic apparatus that includes at least two of the scanning function part, the printing function part, the copying function part, and the facsimile function part, at least one of the functional parts is restricted as a candidate and can be selected as the function restriction release target. And, when the selection operation of at least one of the functions among the functions displayed in the display part as the candidate of the function restriction release target is allowed by the selection part, the operation part of the electronic apparatus acquires the release code by transmitting and receiving respective information with the server and releases the function restriction of the functional parts for the function restriction release target based on the acquired release code. Among at least one of functions restricted as a candidate that can be selected as a function restriction release target, at least one of the functions that the user selected by the selection part becomes usable.

In the function restriction release system of the electronic apparatus according to one aspect of the invention, it is preferable that the operation part performs the function restriction for the functional parts again when a setting time, which is the time since the function restriction of the functional parts has been released, was elapsed.

According to the above configuration, when a setting time, which counts from when the function restriction of the functional parts was released, was elapsed, by the operation part, the functions of the released functional parts are restricted again. Because of this, the restriction of the functional parts is temporary released when the user wants to use it so that the user is able to temporary use the functional parts that the user wants to use.

In the function restriction release system of the electronic apparatus according to one aspect of the invention, a payment screen to request a payment for releasing the restriction of the functional parts for the function restriction release target is displayed in the display part by the server. As a result of the process for the payment requested in the payment screen, when the payment is sent to the server from the transmitter and the server accepts the payment, it is preferable that the receiver receives the release code sent from the server that accepted the payment.

According to the above configuration, the payment screen to request a payment for releasing the restriction of the functional parts for the function restriction release target is displayed in the display part by the server. The user performs a payment process requested in the payment screen (payment operation). As a result of the payment process, when the payment is sent to the server from the transmitter and the server accepts the payment, the release code is sent to the receiver of the function restriction release system from the server. And, the receiver of the function restriction release system receives the release code. Thus, when the payment is completed, it is possible to realize a business model such that the function restriction of the functional parts is released for the function restriction release target.

One aspect of the invention is a function restriction release method of the electronic apparatus, and as a point, it is the function restriction release method of the electronic apparatus having at least one of functional parts that is restricted to execute functions including: a display step that displays candidates of functions that can be selected as a function restriction release target among the functions; a selection step that allows a selection operation of at least one of the functions among the candidates of the functions displayed in the display step and acquires function selection information; a transmitting step that sends the function selection information acquired in the selection step to a server; a device-specific information transmitting step that sends device-specific information of the electronic apparatus to the server before the display step, or after the transmitting step, or at the same time of sending in the transmitting step; a receiving step that receives a release code, which is releasable for the function restriction of the functional parts for the function restriction release target specified from the function selection information in the electronic apparatus corresponding to the device-specific information, from the server; and a control step that releases the function restriction of the functional parts for the function restriction release target based on the release code. According to the above method, the same effect of the invention related to the function restriction release system of the electronic apparatus can be obtained.

One aspect of the invention is an electronic apparatus including: at least one of functional parts that are restricted to execute functions; a memory part that stores device-specific information of the electronic apparatus, a transmitter that sends the device-specific information; a receiver that receives a release code issued for releasing a function restriction of a function that is selected among the functions when the electronic apparatus was judged as to release the function restriction of the functional parts based on the device-specific information; and a operation part that releases the function restriction of the correspondence functional parts based on the release code.

According to the above configuration, the device-specific information stored in the memory part of the electronic apparatus is sent by the transmitter. When it was judged that this is the electronic apparatus to release the function restriction of the functional parts based on the device-specific information, the release code issued for releasing a function restriction of a function that is selected among the functions is received by the receiver. And, the function restriction of the correspondence functional part is released by the operation part based on the release code. Thus, for example, the candidates of the functions that can be selected as a function restriction release target displayed in the display part of the electronic apparatus or the display part of the mobile terminal which is possible to communicate with the electronic apparatus can be confirmed, and it is possible to receive only a release code issued for releasing a function restriction of a function that was selected among the candidates of the functions.

BRIEF DESCRIPTION OF THE DRAWINGS

Referring now to the attached drawings which form a part of this original disclosure.

DETAILED DESCRIPTION OF EXEMPLARY EMBODIMENTS

First Embodiment

The first embodiment which concretizes a function restriction release system of an electronic apparatus of the invention will be explained with reference to FIG. 1 to FIG. 11. By the way, the function restriction release system according to this embodiment includes an electronic apparatus and a mobile terminal, and as one example, it concretizes a multifunction device of a recording device as an electronic apparatus.

Figures 1, 2:
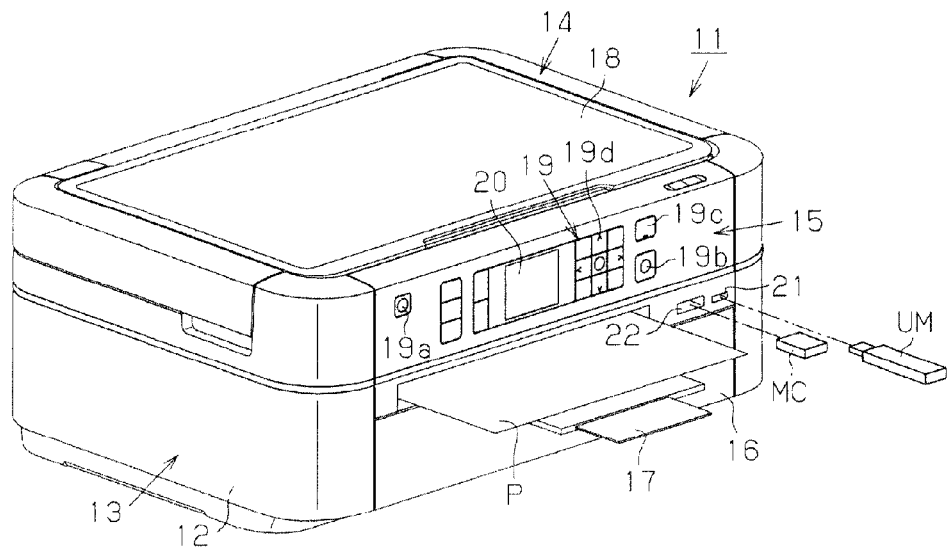
FIG. 1 is a perspective illustration of a multifunction device according to the first embodiment.
FIG. 2 is a schematic diagram showing a release code table.

As shown in FIG. 1, a multifunction device 11 as one example of the electronic apparatus has three functions of a scanner, a printer, and a copier in one device. In the multifunction device 11, a printer part 13 is provided in a lower part of a main body 12, and in the main body 12, a scanner part 14 is arranged in an upper side of the printer part 13. Also, a operation panel 15 is provided on an upper surface part of the main body 12, and in the main body 12, a paper cassette 16, which has a capacity of storing a plurality of papers P, is placed in the lower side of the operation panel 15 in a possible state of the add-remove. The printer part 13 prints on the paper P supplied from the paper cassette 16, and discharges the printed paper P on a catch tray provided in a front surface mid central position of the main body 12. Also, the scanner part 14 is to read (to scan) a copy which is set on a platen (not shown in the drawing) in the lower side of a platen cover 18. By the way, in the multifunction device 11, a copy is performed by the printer to print an image of the copy scanned by the scanner part 14.

The operation panel 15 includes an operation part 19 that controls to give various instructions to the multifunction device 11 and a Liquid Crystal Display (LCD) 20 that displays various menus or images on a screen. The operation part 19 includes a power switch 19a, a print start switch 19b, a copy switch 19c, a selection switch 19d, and the like. For example, by controlling the selection switch 19d to select various items on the menus displayed in the LCD 20, it is possible to select an image for a print target and set print conditions. By the way, by gently pressing the screen for an operation (touch operation), the LCD 20 can be a touch panel which is possible to input the pressed selection item.

Also, an USB port 21 that is possible to insert and remove an USB memory UM, and a card slot 22 that is possible to insert and remove a memory card MC are provided in a front surface side terminal part (right side part in FIG. 1) of the main body 12. The multifunction device 11 is possible to print an image or a document based on a print data received from a host device which is not shown in the drawing, and other than that, the multifunction device can be a stand-alone printer for printing as a single body without connecting to the host device. Also, a memory card printing that prints an image read from the memory card MC inserted in the card slot 22 of the main body, and a USB memory printing that prints an image read from the USB memory UM connected to the USB port 21 are possible. In addition, a copy of an image scanned in the scanner part 14 is stored in an external memory device such as an USB memory, an external hard disk, or the like, which is connected to the USB port 21 so that it can be possible for a storing process which is called as "scan-to-memory".

Figure 3:
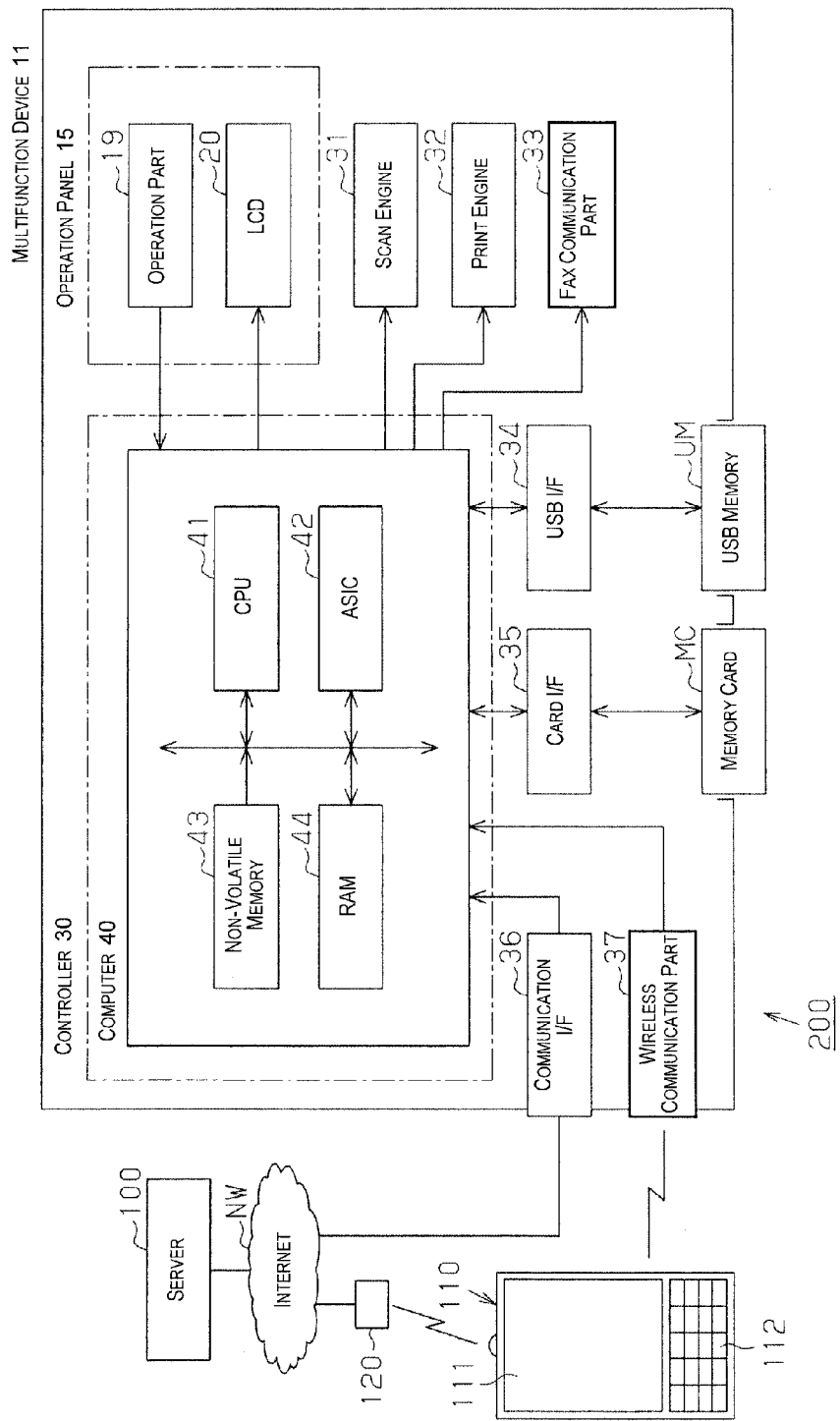
FIG. 3 is a block diagram showing an electrical configuration of a server and a mobile terminal.

Next, the electrical configuration of the multifunction device 11 will be explained with reference to FIG. 3. The multifunction device 11 shown in FIG. 3 connects with a server 100 through an internet NW and it includes a network communication function which is possible to send or receive data with the server 100. The mobile terminal 100 is connected to a switching center 120 (internet gateway, or the like) so that it is possible to connect with the server 100 through the internet NW. The mobile terminal 110 can be, for example, a mobile phone (including a smart phone), a Personal Digital Assistants (PDA) (mobile information terminal), or the like, and it includes a display part 11 and an operation part 112 having various buttons.

The multifunction device 11 includes a controller 30 that instructs entire controls, a operation panel 15, a scan engine 31, a print engine (printing engine) 32, a facsimile communication part (hereafter referred to as "FAX communication part 33), a USB interface (hereinafter referred to as "USBI/F34"), a memory card interface (hereinafter referred to as "Card I/F 35"), a communication interface (hereinafter referred to as "Communication I/F 36"), and a wireless communication part 37.

The controller 30 of the present embodiment includes a computer 40 (microcomputer). The computer 40 includes a Central Processing Unit 41 (CPU), an Application Specific IC (ASIC: Application Specific Integrated Circuit) 42, a non-volatility memory 43, and a RAM 44. By executing a program stored in the non-volatility memory, the CPU 41 instructs the multifunction device 11 to receive an operation signal when the operation part 19 was operated and to switch the screen contents of the LCD 20 in response to the operation signal so that it performs predetermined operations such as scanning, printing, copying, faxing, or the like. By the ASIC 42, the multifunction device 11 performs an image process that generates head control data that has a form usable for a drive system of the print head based on the inputted image data, and by sending the generated head control data to the drive system of the print head, it controls the print head. By the way, it can be possible to have a configuration that all processes or all controls are performed by the CPU 41 without using the ASIC 42.

The USB I/F 34 is used for the controller 30 to access the USB memory UM inserted to the USB port 21 of the multifunction device 11. The controller 30 accesses to the USB memory UM through the USB I/F 34, and it is possible to search, read, and write data (files) in the USB memory UM.

The card I/F 35 is used for the controller 30 to access to the memory card MC inserted to the card slot 22 of the multifunction device 11. The controller 30 accesses to the memory card MC through the card I/F 35, and it is possible to search and read data (files) in the memory card MC.

The communication I/F 36 is used for the multifunction device 11 to connect to the server 100 through the internet NW, and the communication interface is known as to perform a communication control in accordance with a predetermined communication protocol. It is possible that the multifunction device 11 communicates with the server 100 by connecting the internet NW through the communication I/F 36.

The wireless communication part 37 is used for the multifunction device 11 to connect to the mobile terminal 110 by the wireless, and the wireless communication interface is known to perform the communication control in accordance with the predetermined communication protocol. The multifunction device 11 becomes possible to perform the wireless communication with the mobile terminal 11 through the wireless communication part 37. The wireless communication part 37 in this example is a Near Field Communication part so that it is possible to wirelessly communicate in a range of, for example, approximately several meters to several hundred meters. For example, a Bluetooth (registered trademark) communication part, a wireless LAN (e.g., IEEE802.11b), and an inferred red communication part can be applied for the wireless communication part 37. Obviously, the effective communication range of the Near Field Communication relies on standards so that it can be, for example, several ten meters to several hundred meters.

The scan engine 31 includes a drive system, or the like including optical read heads having a row arrangement (CCD method or CMOS method), a motor as a power source to move the read heads in a direction of reading a document (scanning direction), and the like. Also, the print engine 32 includes a conveyance drive system, print heads that supply inks from ink cartridges and print it on a paper, and the like. By the way, the print heads configuring the print engine 32 adapts an inkjet recording method, but a dot impact recording method, or a laser recording method to print toner set on a paper can be adapted.

Also, the FAX communication part 33 is connected to a telephone line, which is not shown in the drawing, and it includes a ring detection part which can detect an incoming call through the telephone line. When the controller 30 acknowledges an incoming facsimile through the telephone line by inputting a ring detection signal from the ring detection part, the FAX communication part 33 becomes a connecting state and the FAX data, which was sent through the telephone line, is received through the FAX communication part 33. The FAX communication part 33 is also used when the fax data is sent from the multifunction device 11.

When the controller 30 receives an instruction for copying, it controls to drive the scan engine 31 and the print engine 32, and the print engine 32 prints an image based on the image data of the document which was read by the scan engine 31 so that it performs "copying" for the document. Also, when the controller 30 receives an instruction for card printing, it controls to drive the print engine 32 to print an image based on the image data which was read from the memory card MC so that it performs "card printing". Other than that, in a condition that it is connected with the host device which is not shown in the drawing, the controller 30 controls to drive the print engine 32 to print an image based on a print data received from the print driver (drawing is omitted) in the host device so that it performs "printing". Also, the controller 30 controls to drive the scan engine 31 to send the scan data of the scanned document to the host device so that it performs "scanning".

Specifically, the multifunction device 11 of the present example has the facsimile function (FAX function) so that it is possible to send and receive a FAX and to print the received FAX image. Also, the multifunction device 11 is possible to print an image based on the image data which was read from the USB memory UM inserted in the USB port that is provided in the main body.

By executing programs stored in the non-volatile memory 43, the CPU 41 performs operations to realize respective functions of the multifunction device 11. The ASIC 42 performs an image processing to generate the head control data with a data format corresponding to the drive system of the print heads based on the image data which is inputted by the multifunction device 11, and by sequentially sending the generated head control data to the drive system of the print heads, the injection control is performed to inject inks from the nozzles of the print heads.

The programs for the firmware, the various setting data, and the like are stored in the non-volatile memory 43 so that the boot program, the Operating System (OS), and the multifunction device 11 realize various functions such as printing, scanning, copying, faxing, and the like. Also, the multifunction device 11 in the present embodiment has a browsing function that enables to connect the internet NW for the Web browse so that the browser program is stored in the non-volatile memory 43. In addition, the multifunction device 11 in the present embodiment has an e-mailing function that enables to connect the internet NW for an e-mail so that the e-mail program is stored in the non-volatile memory 43.

Figure 4:
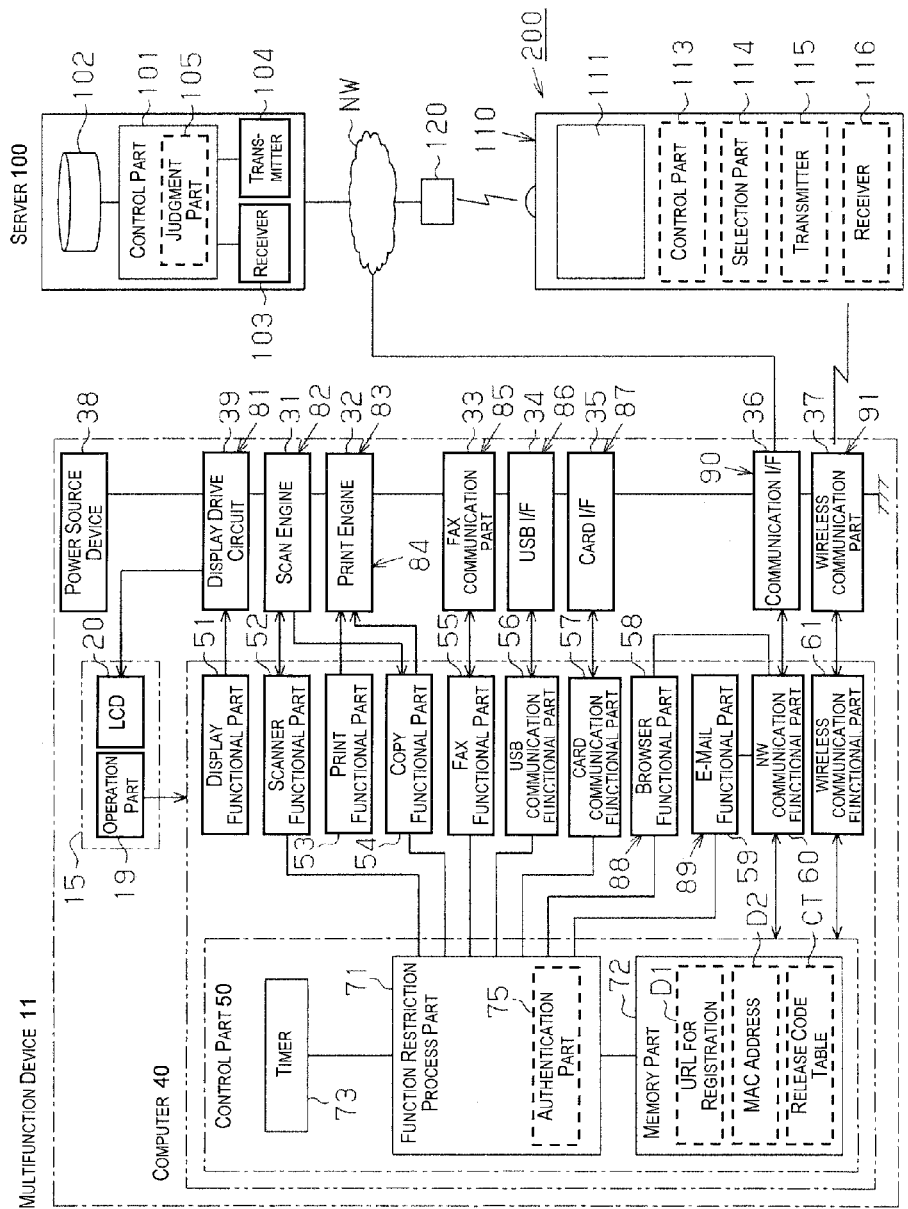
FIG. 4 is a block diagram showing functional configuration of a server and a mobile terminal.

Next, the respective functional configurations of the computer 40, the server 100 and the mobile terminal 110 of the multifunction device 11 will be explained with reference to FIG. 4. The respective parts in the computer 40 as shown in FIG. 4 are mainly the software constructed by that the CPU 41 executes programs stored in the non-volatile memory 43. However, a part of a print functional part 53 is constituted by the electronic circuits of the ASIC 42, or the like.

As shown in FIG. 4, the multifunction device 11 includes the computer 40, the operation part 19, and the LCD 20 as the hardware part, the power source device 38 as one example of the power source part, the display drive circuit 39, the scan engine 31, the print engine 32, the FAX communication part 33, the USB I/F 34, the card I/F 35, the communication I/F 36, and the wireless communication part 37.

The power source device 38 generates primary voltage (e.g., a predetermined value in a range of 15 to 25 volts) by transforming or rectifying the alternating-current voltage from the commercial alternating-current voltage (the drawing is omitted), and additionally generates secondary voltage (e.g., a predetermined value in a range of 15 to 25 volts) by depressing the primary voltage. The primary voltage is mainly applied to each motor drive circuit in the scan engine 31 and the print engine 32, and the secondary voltage is applied to the drive circuit for the print heads in the print engine 32. The output voltage which is the depressed secondary voltage (e.g., a predetermined value in a range of 5 to 20 volts) is applied to the display drive circuit 39. Also, the output voltage which is the depressed secondary voltage (e.g., a predetermined value in a range of 3 to 6 volts) is supplied to the computer 40, the FAX communication part 33, the USB I/F 34, the card I/F 35, the communication I/F 36 and the wireless communication part 37. By the way, the power source device 38 contains a switching circuit (drawing is omitted) that can individually turn on and off the power supply for respective parts 31 to 37, 39, and 40 which are the supply destinations.

Figure 8:
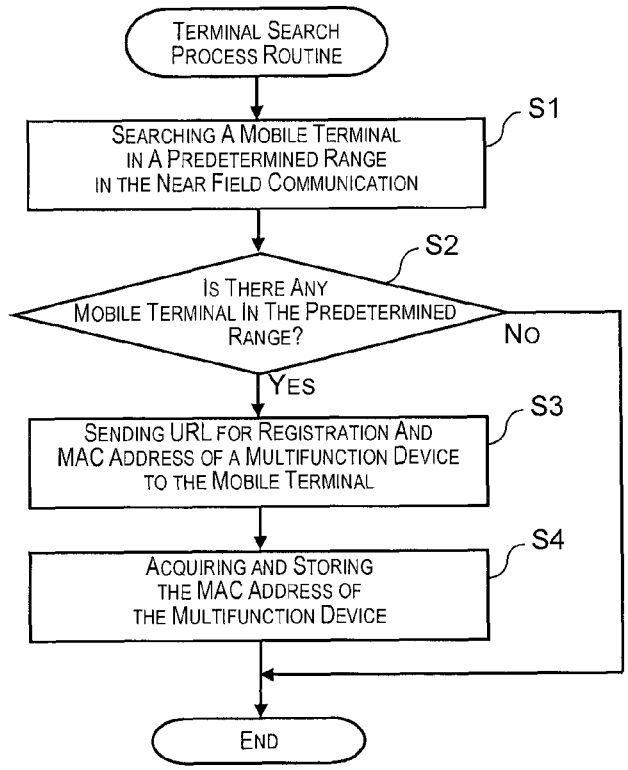
FIG. 8 is a flowchart showing a terminal search process routine.
Figure 9:
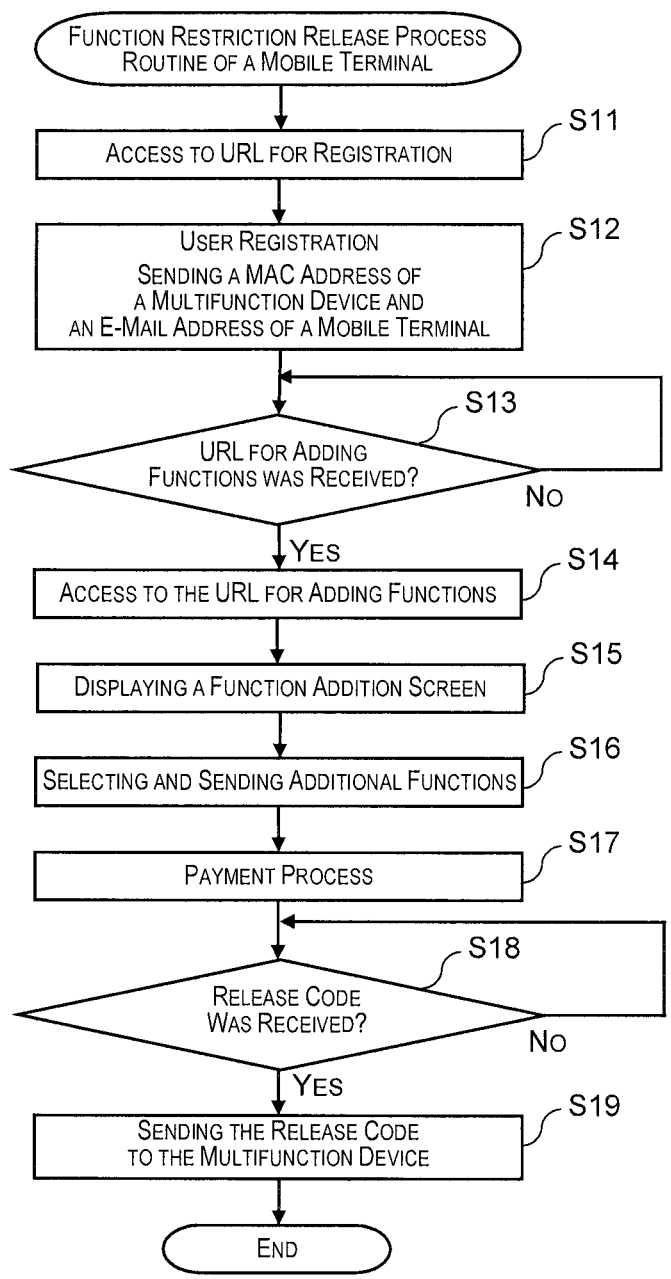
FIG. 9 is a flowchart showing a function restriction release process routine of a mobile terminal.

The computer 40 has respective parts performed by the CPU 41 to execute various programs in the non-volatile memory 43, and specifically, to execute programs intended for the function restriction release showing the flowcharts shown in FIG. 8 and FIG. 9. That is, as shown in FIG. 4, the computer 40 has a operation part 50 and the multifunction device 11, which contains a plurality of functional parts 51 to 61 such as a display system, a scan system, a print system, a FAX system, a communication system, and the like, as a part to realize various functions. In detail, as a functional part, the computer 40 contains a display functional part 51, a scanner functional part 52, a print functional part 53, a copy functional part 54, a facsimile functional part 55 (referring to as "FAX functional part" in FIG. 4), an USB communication functional part 56, a card communication functional part 57, a browser functional part 58, an e-mail functional part 59, a network communication functional part 60 (referring to as "NW communication functional part"), and a wireless communication functional part 61.

In the multifunction device 11 of the present embodiment, a part of functions including the printing function (print function), the display function, a network communication function, and a wireless communication function are only activated (function restriction release) with shipment. And, other functions such as the scanner function, the copy function, the FAX function, the USB communication function, the card communication function, the browser function and the e-mail function are disabled (function restriction). Therefore, the multifunction device 11 contains all hardware that need to realize the functions of the multifunction device, but practically, it only functions as a printer. And, an user, who desires to use the restricted functions of the multifunction device 11, accesses to the server 100 through the internet NW from the mobile terminal 110 and purchases the additional desired functions (functional parts). When the user purchases the functions, a release code (release key) to enable to release the function restriction in each desired functional part is sent from the server 100 to the mobile terminal 110 so that by sending the release code to the multifunction device 11, the function restriction for the additional desired functional parts is released.

In the present embodiment, one function is realized by a functional part including of the software part in which the computer 40 executes programs, and a function realization part including of the hardware part connected to the functional parts to realize the functions. In detail, as shown in FIG. 4, a display function realization part 81 is configured by the display functional part 51, the display drive circuit 39, and LCD 20. Also, a scanner function realization part 82 is configured by the scanner functional part 52 and the scan engine 31, and a print function realization part 83 is configured by the print functional part 53 and the print engine 32. Also, a facsimile function realization part 85 is configured by the facsimile functional part 55 and the FAX communication part 33. Further, a USB communication function realization part 86 is configured by the USB communication functional part 56 and the USB I/F 34, and a card communication realization part 87 is configured by the card communication functional part 57 and the card I/F 35. Also, a browser function realization part 88 is configured by the browser functional part 58, the network communication part 60 and the communication I/F 36, and an e-mail function realization part 89 is configured by the e-mail functional part 59, the network communication functional part 60 and the communication I/F 36. In addition, a network communication function realization part 90 is configured by the network communication functional part 60 and the communication I/F 36, and a wireless communication function realization part 91 is configured by the wireless communication functional part 61 and the wireless communication part 37.

And, in the present embodiment, each function of the scanner function realization part 82, the copy function realization part 84, the facsimile function realization part 85, the USB communication function realization part 86, the card communication function realization part 87, the browser function realization part 88, and the e-mail function realization part 89 is restricted in the initial condition of the multifunction device 11 (e.g., at the time of the shipment). Specifically, in the present embodiment, one example of a functional part of a function restriction release target candidate is configured by these function realization parts 82, and 84 to 89.

In the scanner function realization part 82, the copy function realization part 84, the facsimile function realization part 85, the USB communication function realization part 86 and the card communication function realization part 87, they are in a state that the power supply from the power source device 38 to the scan engine 31, the FAX communication part 33, the USB I/F 34 and the card I/F 35 as the respective hardware parts is stopped. Specifically, in these function realization parts 82, and 84 to 87, the hardware parts are also functionally restricted. Here, in the coy function realization part 84, the function of the print engine which is a part of its hardware part is not restricted, but the function of the scan engine is restricted so that the function of the hardware part is practically restricted. Also, the communication I/F 36 as the hardware part corresponding to the browser functional part 58 and the e-mail functional part 59, respectively is not restricted because it shares with the network communication functional part 60 which is the available function. Because of this, by restricting the functions of the browser functional part 58 and the e-mail functional part 59 as the software part, the browser function and the e-mail function are restricted.

This section will describe about the respective functional parts 51 to 61. The display functional part 51 displays a user interface screen (hereinafter referred to as "UI screen") such as a menu screen, a setting screen, or the like in the LCD 20 through the display drive circuit 39. In the menu screen, among the respective functions of "print", "scanner", "copy", "FAX", "USB communication", "memory card print", "browser", and "e-mail", at least one of them can be selected. When one of these functions was selected by controlling the controller 19, a subordinate setting screen will be further displayed. Also, the LCD 20 displays a selection button for selecting a terminal search function to search a mobile terminal, and when the selection button was selected by controlling the controller 19, the computer 40 executes a terminal search process routine as shown in FIG. 8. Besides that, a print image based on the image data for a print target is displayed in the LCD 20.

The scanner functional part 52 reads a document by driving the scan engine 31. The print functional part 53 drives print engine 32 based on the print data. The print engine 32 includes print heads that inject inks on a paper, a conveyance motor that conveys a paper, and the like. Also, when the print functional part 53 received an instruction to execute the "card print", it generates the print data based on the image data read from the memory card MC and the print engine 32 is driven to print an image based on the print data. Also, the print functional part 53 prints an image based on the print data received from the host device.

When the copy functional part 54 received an instruction to execute the "copy" by controlling the copy switch 19c, the scan engine 31 is driven to read a document and it generates the print data based on the image data of the read document so that the print engine 32 is driven to print (copy) an image based on the print data.

When the facsimile functional part 55 acknowledged an incoming facsimile through the telephone line (not shown in the drawing) by inputting a ring detection signal from the ring detection part of the FAX communication part 33, the FAX communication part 33 becomes in a state of connecting and performs the receiving process to receive the facsimile data, which is sent through the telephone line, through the FAX communication part 33. Also, the facsimile functional part 55 performs a transmitting process to send the facsimile data through the FAX communication part 33.

The USB communication functional part 56 performs a serial-bus communication with the USB device such as a USB memory UM, or the like through the USB I/F 34. For example, it performs a print process to print an image based on the image data which was read from the USB memory UM, and for example, it performs a writing process to write the image data, which was read in the scanner part 14, to the USB device such as the USB memory UM, the USB system of an external hard disk, or the like.

The card communication functional part 57 performs a reading process that reads the image data from the memory card MC through the card I/F 35. The read image data is sent to the print functional part 53 and the print functional part 53 transforms the image data to the print data so as to print an image based on the print data.

The network communication functional part 60 performs a network communication through the communication I/F 36. The network communication functional part 60 performs a network communication process in accordance with the predetermined communication protocol (e.g., a transport layer, a session layer, a presentation layer).

The browser functional part 58 is created by that the computer 40 executes the browser program. The browser functional part 58 performs a communication process through the network communication functional part 60 and the communication I/F 36 in accordance with a predetermined communication protocol (e.g., Hyper Text Transfer Protocol (HTTP)). In detail, the browser functional part 58 downloads a HTML file or an image file, or the like from a Web server and the like through the internet NW, and by analyzing the layout, it is reproduced or displayed in the LCD 20. Also, the browser functional part 58 sends data to a Web server or the like by using an input form, and it has a function to reproduce software or animation described in the Web data. By the way, the browser function is available in the multifunction device 11 having the LCD 20 in a large size, or the multifunction device 11 having a large monitor by the option.

The e-mail functional part 59 is created by that the computer 40 executes the e-mail program. The e-mail functional part 59 performs to send and receive an e-mail through the network communication functional part 60 and a communication I/F 36 in accordance with an e-mail transfer protocol (SMTP) and an e-mail receive protocol (POP3).

The wireless communication functional part 61 is created by that the computer 40 executes the Near Field Communication program. The wireless communication functional part 61 performs the Near Field Communication process through the wireless communication part 37 in accordance with a predetermined wireless communication protocol. As the Near Field Communication method, it uses the public known Near Field Communication standard which uses a radio wave such as, for example, Bluetooth (registered trademark), TransferJet (registered trademark), ZigBee (registered trademark), Wireless 1394, or the like. Obviously, the Near Field Communication method can be the infrared communication method (Infrared Data Association (IrDA) or IrBurst (next generation IrDA)) which performs a communication by using an infrared ray. The wireless communication part 37 having a communication interface corresponding to these Near Field Communication methods is used.

The operation part 50 includes a function restriction process part 71 that performs a process to release the restriction of the functional parts selected in the functional parts as the function restriction release candidates, a memory part 72 that stores various data which is necessary for the function restriction release process, and a timer 73 that counts time. In the present embodiment, the function restriction release system 200 is configured by the multifunction device 11 as an electronic apparatus and the mobile terminal 110. And, the function restriction release process that releases the function restriction of the functional part in the multifunction device 11 is performed by a dialogue of data between the mobile terminal 110 and the multifunction device 11 in the Near Field Communication, and by a dialogue of data between the mobile terminal 110 and the server 100 through the internet NW.

The memory part 72 is, for example, a part of the memory area of the non-volatile memory 43, and the URL for registration and respective data D1, D2 of the MAC address of the multifunction device 11 are stored as shown in FIG. 4. In addition, the memory part 72 stores the release code table CT as shown in FIG. 2.

The operation part 50 performs a terminal search process to wirelessly search the mobile terminal 110 existed in a predetermined range of the multifunction device 11 (e.g., within a predetermined distance in a range of 0.2 to 2 meters). In this time, the operation part 50 instructs the wireless communication functional part 61 to limit a relatively narrow predetermined range of a possible communication area (search area) from the multifunction device 11 so as to reduce the output of the radio waves of the wireless communication part 37. Because of this, when the user puts the mobile terminal 11 in a position close to the predetermined range from the multifunction device 11, the mobile terminal 110 is selectively searched and a communication is automatically established between the wireless communication part 37 of the multifunction device 11 and the mobile terminal 110. And, the operation part 50 wirelessly sends the URL for the registration and the respective data D1, D2 of the MAC address, which are necessary for the access to the server 100 to perform the function restriction release process to the searched mobile terminal 110, to the mobile terminal 110. By the way, in the present embodiment, the data D2 of the MAC address corresponds to one example of the device-specific information.

And, the operation part 50 receives a release code, which was received from the server 100 by the data communication between the mobile terminal 110 and the server 100, through the wireless communication part 37 by the wireless communication between the mobile terminal 110 and the multifunction device 11. And, the operation part 50 performs an authentication process to compare the received release code with the correspondence function of the release code in the release code table CT as shown in FIG. 2. As shown in FIG. 2, the release code table CT is the table data corresponding between the functions and the release codes in every function of the function restriction release target candidate. As a result of the authentication process, if the release is accepted, the function restriction process part 71 releases the function restriction of the correspondence functional part which was accepted for the release in the authentication result.

The respective function realization parts 82 to 86, 88, and 89 have a function restriction judgment flag as, for example, a value of "1" in a function restriction condition and a value of "0" in a function restriction release condition. For example, if the release is accepted, the function restriction process part 71 changes from "1" to "0" for the function restriction judgment flag of the correspondence functional part. Before activating each functional part, more specifically, before the CPU 41 to execute the program for realizing the function, the value of the function restriction judgment flag is read. If the value is "0", the program for realizing the function is executed. If the value is "1", the program for realizing the function is not executed. Because of this, if the function restriction judgment flag is "1", the functional part is activated. If the function restriction judgment flag is "0", the functional part is not activated. Thus, when the release was accepted by the release code authentication, by changing "1" to "0" in the function restriction judgment flag for the correspondence functional part, the functional part, in which the function was released when the multifunction device 11 was restarted, is activated immediately after the function restriction release process was performed.

A timer 73 as shown in FIG. 4 counts the elapsed time from when the function restriction of the functional part of the function restriction release target was released in accordance with the instruction of the function restriction process part 71. The function restriction process part 71 judges whether or not the elapsed time of the timer 73 is over the setting time, and when the elapsed time is over the setting time, the released function restriction of the functional part is restricted again. In other words, the function of the functional part is temporary released in the present embodiment.

Figure 10:
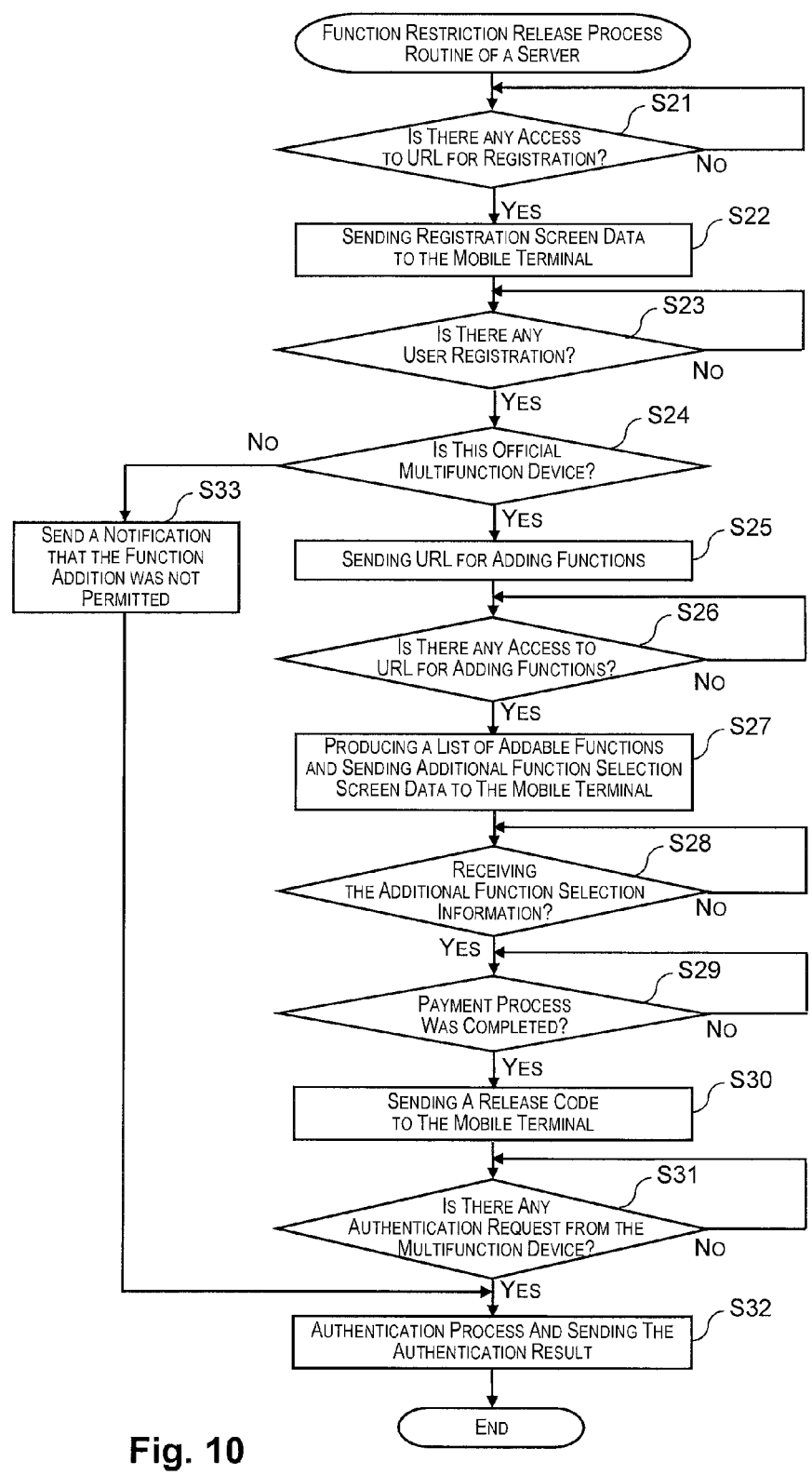
FIG. 10 is a flowchart showing a function restriction release process routine of a server.
Figure 11:
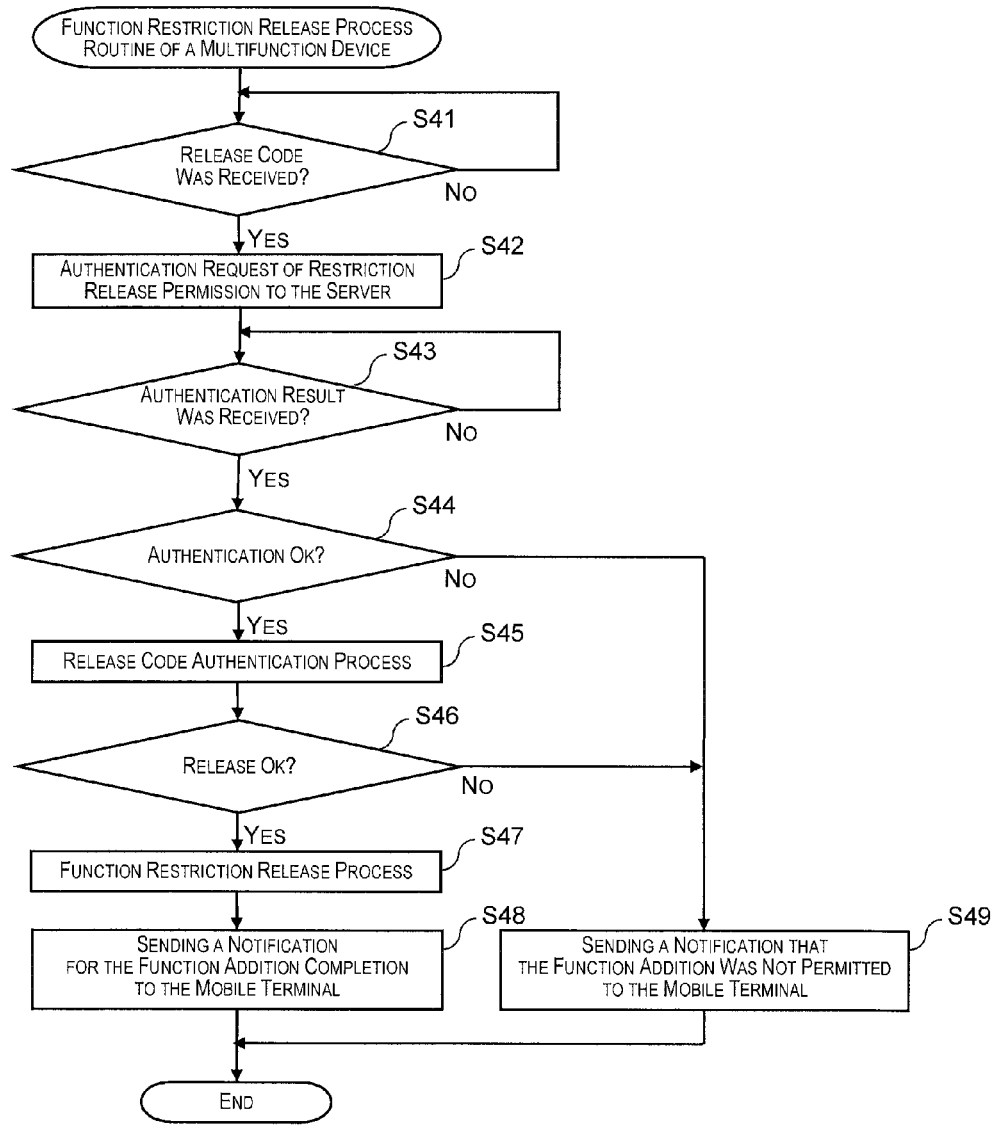
FIG. 11 is a flow chart showing a function restriction release process routine of a multifunction device.

Besides the control of various functional parts 51 to 61, the operation part 50 performs a control and a process to release the function restriction of the functional part in which the function was restricted. The function restriction process part 71 in the controller 51 performs a control and a process that is necessary to release the function restriction of the functional part (hereinafter referred to as "restriction release process"). This restriction release process includes the "terminal search process" to send the MAC address of the multifunction device 11 and the URL for the registration to the mobile terminal 110, in which the communication was established, as a result of the wireless search that wirelessly searches the mobile terminal 110 existed in a predetermined range. In addition, in the restriction release process, after that, the authentication for whether the restriction of the functional part is released is requested by using the release code to the server 100 when the release code was received from the mobile terminal 110. When the response as an authorized authentication is received from the server 100, the authentication of the release code is performed and when the result of the authentication is that the release is accepted, the function restriction of the functional part corresponding to the release code is released. This "function restriction release process" is included in the restriction release process. This "function restriction release process" processes between the server 100 and the mobile terminal 110 so that the "function restriction release process" is respectively performed in the server 100 and the mobile terminal 110. By the way, the flowchart in FIG. 8 shows the program by which the computer 40 of the multifunction device 10 executes the terminal search process. Also, each flowchart of FIG. 9 to FIG. 11 shows each program by which each computer of the respective mobile terminal 110, server 100, and multifunction device 11 executes the function restriction release process.

On the other hand, the server 100 includes a operation part 1W, a data storage part 102, a receiver 103 (server receiver), and a transmitter 104 (server transmitter). The operation part 101 includes a judgment part 105. The judgment part 105 is the functional part created by which the computer in the server 100 executes the program for the judgment process. In the data storage part 102, the registered database, which includes, for example, the device-specific information (MAC address, or the like), the user registration information, the function restriction information, the function restriction release information, the release code, and the like corresponding to each multifunction device, is stored for all sold multifunction devices. Also, in the data storage part 102, the program for the operation panel which is possible to display the operation panel screen to control the multifunction device by the mobile terminal 110, and the resource to use this program are stored.

The receiver 103 receives the function selection information that the user selected by controlling the mobile terminal 110, and the data D2 of the MAC address (device-specific information). The judgment part 105 performs the authentication process based on the MAC address as an example of the device-specific information which is uniquely identifiable for a multifunction device, and judges whether or not this is the official multifunction device to release the function restriction. When it is judged that this is the official multifunction device based on the authentication result of the judgment part 105, the data base in the data storage part 102 is reviewed and the restriction release information of the identified multifunction device 11 is acquired so as to produce the list data of the function restriction release target candidates. And, the transmitter 104 sends the list data of the function restriction release target candidates to the mobile terminal 110. Also, when the user, who viewed the list of the function restriction release target candidates in the mobile terminal 110, selects at least one of the function restriction release target candidates from the list, the mobile terminal 110 sends the function selection information to the server 100 and the function selection information is received in the receiver 103 of the server 100. The operation part 101 of the server 100 searches and acquires the release code from the database of the data storage part 102 to release the function restriction in each functional part identified from the function selection information, and the acquired release code of each functional part is sent to the mobile terminal 110 by the transmitter 104.

Also, the mobile terminal 110 includes a operation part 113, a selection part 114, a transmitter 115, and a receiver 116. The operation part 113 controls the display control to display various screens in the display part 111. During the function restriction release process, the operation part 113 displays various screens G1 to G6 as shown in FIGS. 5(a) to 5(f) in the display part 111. For example, the operation part 113 displays an additional function selection screen G4 as shown in FIG. 5(d) in the display part 111. In this additional function selection screen G4, the candidates of available additional functions are displayed. Specifically, by this additional function selection screen G4, the functions for the function restriction release target candidates are displayed in the display part 111. By the way, the respective screens G1 to G6 in detail will be described later.

The selection part 114 receives a selection of at least one of the functions for the function additional target (function restriction release target) by the user to control the controller 112 among the candidates of the available additional functions in the additional function selection screen G4 displayed in the display part 111. Besides, the selection part 114 receives selections by controlling the controller 112 in various screens displayed in the display part 111. By the way, the selection part 114 includes the controller 112.

The transmitter 115 performs a transmitting process that sends various types of information received in the selection part 114 such as the MAC address (device-specific information) of the multifunction device 11 and the function selection information to the server 100 through the internet NW. Also, the transmitter 115 performs a transmitting process that wirelessly sends various types of information such as a release code received from the server 100 to the multifunction device 11.

The receiver 116 receives a release code, which is releasable to the function restriction of the functional parts for the function restriction release target identified from the function selection information in the multifunction device 11 identified from the MAC address, from the server 100. Also, the receiver 116 performs a receiving process that wirelessly receives the respective data D1, D2 of the URL for the registration and the MAC address of the multifunction device 11 from the mobile terminal 110.

Next, operations of a function restriction release system 200 in the compound 11 and the mobile terminal 110 will be explained based on the sequence diagram shown in FIG. 6 and the flowcharts shown in FIG. 8 to FIG. 11, while reviewing the screens displayed in display part 111 of the mobile terminal 110 shown in FIG. 5 and FIG. 7, if necessary.

The multifunction device 11 is marketed in a condition that the functions of the functional parts are restricted in the initial state. If the user desires additional functions in the restricted functional parts, the functions can be added by the necessary operations to release the function restriction. Also, in another example of the usage, in a situation that the multifunction device 11 is used in the hotels, the community facilities, and the like, if the user desires the functions other than the printing, the user can add the functions by performing the necessary operations for the function restriction release in the same manner. In the present embodiment, the payment is required for the additional functions.

First of all, the user locates his/her mobile terminal 110 in a predetermined range of the multifunction device 11. Next, the user turns on the power by controlling the power switch 19a of the multifunction device 11, or the user activates the terminal search function by controlling the controller 19 in the menu screen of the multifunction device 11. As a result, the operation part 50 of the multifunction device 11 instructs the wireless communication functional part 61 to reduce the output of the radio wave of the wireless communication part 37 so as to limit the possible wireless communication area (effective communication area) in a predetermined range (e.g., within 1 meter in a radius), and it performs the terminal search process to search the mobile terminal 110 existed in the predetermined range of the multifunction device 11. This terminal search process performs during a set period of time from the time of the power activation operation or the terminal search function activation operation.

The terminal search process routine shown in FIG. 8, which is executed when the power activation operation or the terminal search function activation operation was performed in the multifunction device 11, will be explained. In Step S1, the mobile terminal 110 is searched in a predetermined range by the Near Field Communication. Specifically, the operation part 50 limits the possible wireless communication area in a predetermine range (e.g., within 1 meter in a radius) by reducing the output of the radio wave of the wireless communication part 37, and it searches a communication device such as the mobile terminal 110, which is equipped with the wireless communication function, existed in the predetermined range ((1) in FIG. 6).

Next, in Step S2, it is judged whether or not the mobile terminal 110 was existed in the predetermined range. When it was judged that the mobile terminal 110 was existed in the predetermined range, it proceeds to Step S3. When it was judged that the mobile terminal 110 was not existed in the predetermined range, the routine is end.

In Step S3, the URL for the registration and the MAC address of the multifunction device 11 are sent to the mobile terminal 110. The data D1 of the URL for the registration is sent as a screen data in which the URL is described as the designated link, and the operation part 113 of the mobile terminal 110 displays the registration guide screen G1 shown in FIG. 5(a) in the display part 111 based on the data D1. Also, the data D2 of the MAC address of the multifunction device 11 sent to the mobile terminal 110 is temporary stored in the memory of the mobile terminal 110 ((2) in FIG. 6).

Figure 6:
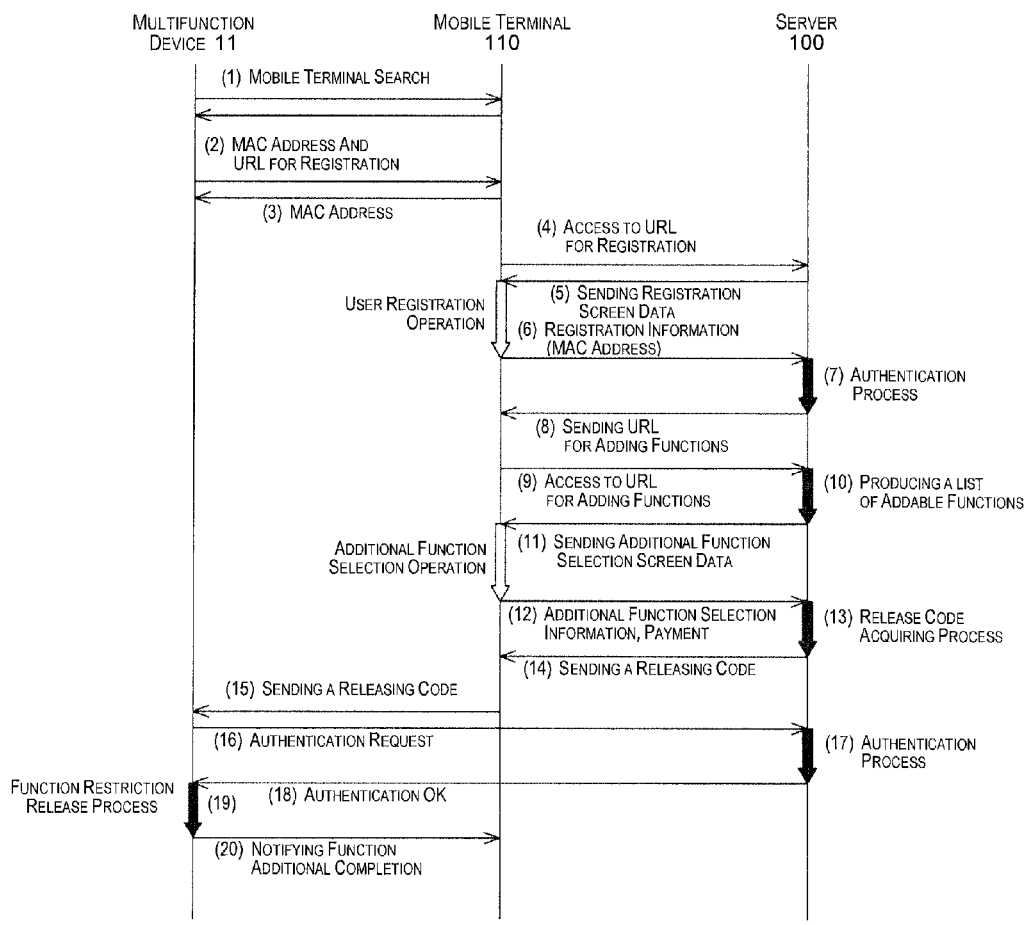
FIG. 6 is a sequence diagram showing a function restriction release process.

Next, in Step S4, the MAC address of the mobile terminal 110 is acquired and is stored in the memory (e.g., RAM 44) ((3) in FIG. 6). Thus, the MAC address is exchanged between the multifunction device 11 and the mobile terminal 110.

Next, the function restriction release process performed between the mobile terminal 110 and the server 100 will be explained with reference to the function restriction release process routine of the mobile terminal 110 shown in FIG. 9 and the function restriction release process routine of the server 100 shown in FIG. 10.

In Step S11, it accesses to the URL for the registration. In other words, the user controls the controller 112 of the mobile terminal and selects the URL for the registration in the registration guide screen G1 shown in FIG. 5(a) so that it accesses to the page of the designated link provided by the server 100.

On the other hand, the server 100 judges whether or not there is an access to the URL for the registration (Step S21). When there is an access to the URL for the registration, the server 100 sends the requested registration screen data to the mobile terminal (Step S22). The controller 113 of the mobile terminal 110 displays the user registration screen G2 shown in FIG. 5(b) in the display part 111 based on the registration screen data. The user controls the controller 112 of the mobile terminal 110 to input the necessary information such as the user information, the MAC address of the multifunction device, the e-mail address of the mobile terminal, and the like in the entry field 11 to 13 in the user registration screen G2 shown in FIG. 5(b), and after the input, the send button 131 is selected to send the user registration (hereinafter simply referred to as "registration information") to the server so as to perform the user registration (Step S12).

The server 100 judges whether or not there was a user registration (Step S23). In other words, the server 100 judges whether or not the registration information was received. When there was a user registration, next, the server 100 performs an authentication process to judge whether or not this is the official multifunction device. This authentication process is performed in the judgment part 105 of the operation part 101. The judgment part 105 performs the authentication process for the multifunction device 11 by judging whether or not it corresponds to the MAC address in the registration information in the MAC address group which is registered as the official multifunction device in the database of the data storage part 102. When it is judged that this is the official multifunction device (affirmative judgment in Step S24), the server 100 sends the URL for an additional function to the mobile terminal 110 by the e-mail of the destination address in the registration information or as the Web data which describes the URL for the additional function (Step S25). By the way, when it is judged that this is not the official multifunction device (negative judgment in Step S24), a notice that the additional function was not allowed is sent to the mobile terminal 11 and the routine is end.

Figure 5A:
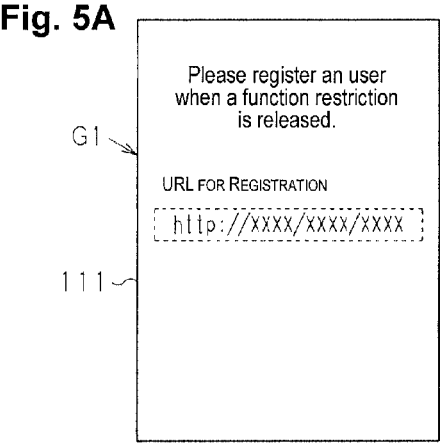
FIG. 5A to 5F are a schematic diagram showing a screen displayed in a mobile terminal.
Figure 5B:
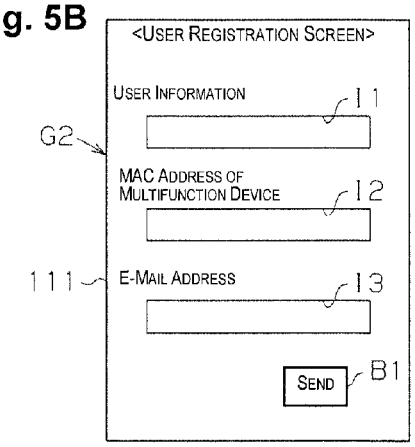
Figure 5C:
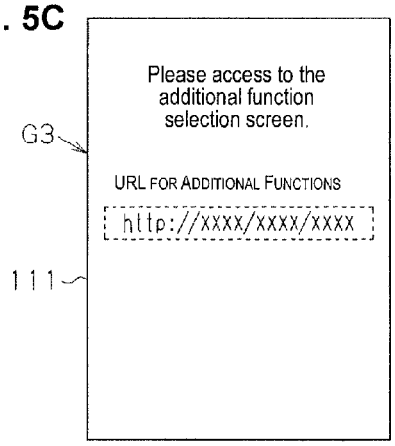
Figure 5D:
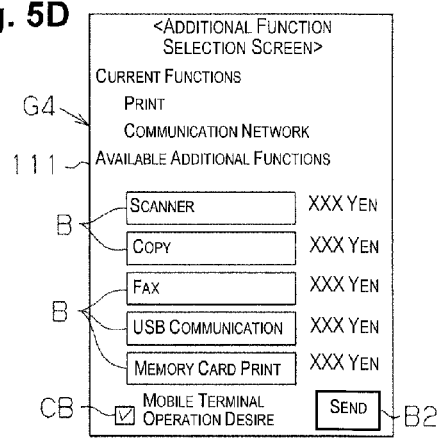
Figure 5E:
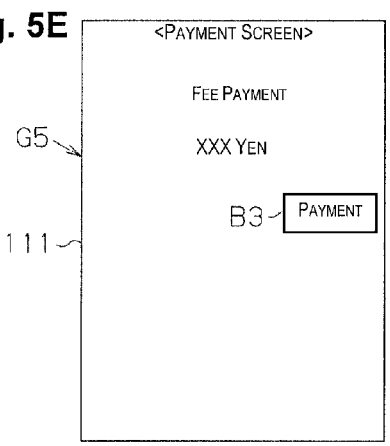
Figure 5F:
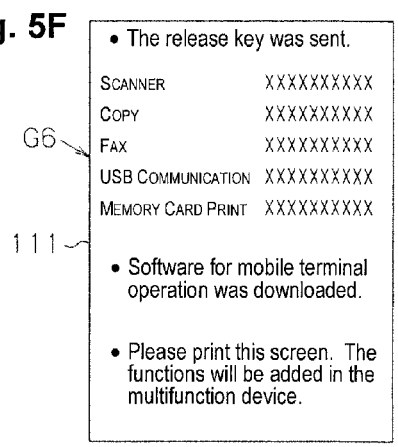

When the operation part 113 of the mobile terminal 110 receives the URL for the additional function (affirmative judgment in Step S13), by allowing the user to perform the opening operation for the e-mail in a case of the e-mail, or by instructing the display process of the Web screen to the browse software in a case of the Web data, the additional function guide screen G3 shown in FIG. 5(c) is displayed in the display part 111. And, when the operation that the user selects the URL for the additional function in the additional function guide screen G3 is accepted, the operation part 113 accesses to the URL for the additional function (Step S14).

When there is an access to the URL for an additional function (affirmative judgment in Step S26), the server 100 provides a list of the candidates of the available additional functions (function restriction release target candidates) and sends the additional function selection screen data which describes the list to the mobile terminal 110 (Step S27).

In the mobile terminal 110, the operation part 113 displays the additional function selection screen G4 shown in FIG. 5(*d*) in the display part 111 based on the additional function selection screen data received from the server 100 (Step S15). As shown in FIG. 5(*d*), in the additional function selection screen G4, the present functions, for example, "print" and "network communication" are shown and the available additional function candidates, for example, "scanner", "copy", "FAX", "USB communication", "memory card print" are shown with the respective fees. These respective functions are displayed as a form of the selectable selection button B.

The user controls the controller 112 of the mobile terminal 110 to select the selection button B corresponding to the desired additional function (function restriction release target) among the selection button B of each function in the additional function selection screen G4 shown in FIG. 5(*d*). In this point, it is possible to select multiple functions by reciprocally switching a selection condition and a non-selection condition every time the selection button B is selected. Also, when the user desires to add (download) the software for a mobile terminal operation to display the operation, screen G7 (menu screen, and the like) (see FIG. 7) which is used for the operation to send an instruction to the multifunction device 11 from the mobile terminal 110, the operation part 112 controls to select a check box CB for the "mobile terminal control desire" in the additional function selection screen G4. And, when the selection of the additional function is end, the send button B2 is selected to send the additional function selection information (function selection information), which includes the selection contents of the additional functions (specifically, it is the functions for the restriction release target), to the server 100 (Step S16).

When the operation part 101 judges the additional function selection information was received (affirmative judgment in Step S28), the server 100 calculates the payment by summing the princes for the added functional parts identified from the additional function selection information and notifies the payment described in the payment screen data to the mobile terminal 110. In the mobile terminal 110, the operation part 113 displays the payment screen G5 (payment screen) shown in FIG. 5(*e*) in the display part 111 based on the payment screen data. The user makes, e.g., an online payment by selecting the payment button B3 in the payment screen G5 by controlling the controller 112 of the mobile terminal 110. By the way, the payment method is not limited to the online payment, but it can appropriately change to other payment methods. For example, when the multifunction device 11 is used in a hotel, a method can be adapted such that the usage fee is added to the room charge as a billing amount.

When the operation part 101 receives a notice that the payment process is completed (affirmative judgment in Step S29), the operation part 101 acquires a release code from the data storage part 102 and the transmitter 104 sends the release code to the mobile terminal 110 (Step S30). In detail, the operation part 101 searches the database in the data storage part 102 by using the MAC address and the additional function selection information as a search key and acquires a release code of the functional parts identified from the additional function selection information in the multifunction device 11 identified from the MAC address. In addition, the operation part 101 provides a release key notification screen data which describes a release code in each acquired functional part. And, the transmitter 104 sends the release key notification screen data to the mobile terminal 110. In this point, the operation part 101 computes a hash value based on the MAC address of the multifunction device 11 and the release code which is sent to the mobile terminal 110, and registers the hash value of each functional part corresponding to the appropriate multifunction device in the database. By the way, when the additional function selection information which marked the check box CB of "mobile terminal control desire" in the additional function selection screen G4, the operation part 101 acquires the software for the mobile terminal control from the data storage part 102 and it is sent to the mobile terminal 110 with the release key notification screen data.

In the mobile terminal 110, the receiver 116 judges whether or not the release code was received (Step S18). When the receiver 116 receives the release key notification screen data, the operation part 113 displays the release key notification screen G6 shown in FIG. 5(*f*) in the display part 111 based on the release key notification screen data. The release key notification screen G6 discloses the release code (release key) (it discloses "xxxxxxxxxx" in the same drawing) in each additional function, and when it has the "mobile terminal control desire", it discloses that the software for the mobile terminal control was downloaded. By the way, the release code can be contained in the header information of the release key notification data.

In the present embodiment, as disclosed in the lowest part of the release key notification screen G6, when the screen G6 is controlled to perform a print operation in the multifunction device 11, there is a structure that the release code is sent to the multifunction device 11. The user activates the software for the mobile terminal control which was downloaded in the mobile terminal 11. The display part 111 displays the control screen G7 shown in FIG. 7. The user controls the controller 112 to select the "print" in the control screen G7 so as to perform the print operation to print the screen G6. When the operation part 113 receives the print operation instruction, the transmitter 115 is instructed to send the release key notification screen data to the multifunction device 11. The transmitter 115 sends the release key notification screen data, which was instructed, to the multifunction device 11. Thus, by sending the release key notification screen data to the multifunction device 11 as the print data, the operation part 113 sends the release code, which is included in the main body of the release key notification screen data (or the header information), to the multifunction device 11 (Step S19).

Therefore, as shown in FIG. 6, when the user accesses the registration URL from the mobile terminal 110, the registration screen data is sent from the server 100 ((5) in the same drawing), and the user registration screen G2 shown in FIG. 5(*b*) is displayed in the mobile terminal 110. The user performs the operation for the user registration in the user registration screen G2 and the registration information including the MAC address is sent to the server 100 ((6) in the same drawing). Next, the server 100 performs the authentication process of the multifunction device 11 based on the MAC address of the registration information ((7) in the same drawing), and as a result of the authentication, when it is judged that this is the official multifunction device 11, the URL for the additional functions is sent to the mobile terminal by e-mail ((8) in the same drawing).

When the user opens the received e-mail, the additional function guide screen G3 shown in FIG. 5(*c*) is displayed in the mobile terminal 110. The user accesses the URL for the additional functions in the additional function guide screen G3 ((9) in the same drawing). When there is the access, the server provides a list of the available additional functions ((10) in the same drawing), the additional function selection screen data including the list is sent to the mobile terminal 110 ((11) in the same drawing). And, the user performs the operation for selecting the additional functions in the additional function selection screen G4 shown in FIG. 5(d) which is displayed in the mobile terminal ((12) in the same drawing). The server 100 acquires a release code of each function to release the restriction of the additional functions (functions of the function restriction release target) by using the acquired MAC address and the additional function selection information as a search key ((13) in the same drawing). And, the server 100 sends the acquired release code to the mobile terminal 110 ((14) in the same drawing). In the mobile terminal 110, the release key notification screen G6 is displayed and when the print operation is performed to print the screen G6, the release code is sent to the multifunction device 11 from the mobile terminal 110 ((15) in the same drawing).

As described above, when the release code is sent from the mobile terminal 110 to the multifunction device 11, next, the function restriction release process is performed between the multifunction device 11 and the server 100. Hereinafter, the function restriction release process will be explained based on the function restriction release process routine of the server 100 as shown in FIG. 10 (respective processes after Step S31) and the function restriction release process routine of the multifunction device 11 as shown in FIG. 11.

In the multifunction device 11, when the release code is received from the mobile terminal 110 (affirmative judgment in Step S41 in FIG. 11), the operation part 50 requests the authentication of the restriction release authorization to the server 100 (Step S42). At the time of the authentication request, the operation part 50 sends the identification information including at least the MAC address, which identifies the mobile terminal 110.

In the server 100, when the authentication request (activation request) is received from the multifunction device 11 (affirmative judgment in Step S31), the judgment part 105 in the operation part 101 performs the authentication process and the result of the authentication is sent to the multifunction device 11 (Step S32). In detail, the judgment part 105 performs the authentication process to judge whether or not, for example, a hash value, which is computed by the MAC address of the appropriate multifunction device 11 registered in the data base of the data storage part 102 and the release code, and a hash value, which is computed by the MAC address received from the multifunction device 11 and the release code, are corresponded.

In the multifunction device 11, when the result of the authentication is received (affirmative judgment in Step S43), it is judged whether or not the authentication is accepted (Step S44). When the authentication is accepted, the operation part 50 performs the release code authentication process (Step S45). In detail, the operation part 50 judges whether or not the release code in each function corresponds to the release code of the correspondence function in the release code table CT stored in the memory part 72 (see FIG. 4), and it performs the release code authentication process. Obviously, the release code authentication process method can be adapted to an appropriate another method which is publicly known. By the way, the operation part 50 of the multifunction device 11 acquires the MAC address of the mobile terminal 110 when the release code is received as a part of the screen print data or the header information from the mobile terminal 110 so that it compares with the MAC address of the mobile terminal 110, which was preliminary registered, to perform the authentication process of the mobile terminal 110. As a result of the authentication, when it is the different mobile terminal 110, the function restriction release is not authorized.

And, when the release code authentication process is completed, it is judged whether or not the release is acceptable based on the authentication result (Steps S46). When the release is acceptable, the function restriction release process is performed (Step S47). The function restriction process part 71 in the operation part 50 changes the function restriction judgment flag of the functional parts, which correspond to the additional functions, from "1" to "0" so that the function restriction release process is performed. Also the operation part 50 switches the switch circuit of the power source device 38 so as to supply the power to the hardware parts corresponding to the functional parts which were released from the function restriction. And, the operation part 50 activates the multifunction device 11 if necessary, and the function realization parts, which correspond to the additional functions, are activated.

When the function restriction release process is completed, the operation part 50 sends a notice that the function addition is completed to the mobile terminal 110 (Step S48). On the other hand, when the authentication result by the server 100 shows that the authentication is not acceptable (negative judgment in Step S44), the operation part 50 sends a notice that the function addition is not accepted to the mobile terminal 110 (Step S49).

As shown in FIG. 6, the multifunction device 11, which received the release code ((15) in the same drawing) sent from the mobile terminal 110, performs the authentication request to the server 100 ((16) in the same drawing). And, the server 100 performs the authentication process and when the authentication result shows that the authentication was accepted, it sends a notification that the authentication was accepted to the multifunction device 11 ((18) in the same drawing). The multifunction device 11, which received the notice that the authentication was accepted, performs the function restriction release process of the function realization parts corresponding to the additional functions ((19) in the same drawing). As a result, the function restriction of the function realization parts corresponding to the additional desired functions is released so that the user can use the desired functions in the multifunction device 11. And, the multifunction device 11, which completed the function restriction release process, notifies the function addition completion to the mobile terminal 110 (function restriction release completion notification) ((20) in the same drawing).

For example, when the multifunction device 11 is provided in a hotel and the user desires to use the restricted functions of the multifunction device 11, the restriction of the functions is released by the payment of the fees. For example, when the user desires to use the scanner, the function restriction of the scanner function realization part 82 is released by the payment of the fee so that the user can use the scanner. Also, for example, when the user desires to use the copy, the function restriction of the copy function realization part 84 is released by the payment of the fee so that the user can use the copy. In addition, for example, when the user desires to use the FAX, the function restriction of the facsimile function realization part 85 is released by the payment of the fee so that the user can use the FAX.

And, when the function restriction was released, the operation part 50 starts counting the elapsed time, which counts from when the function restriction was released in each functional part, by the timer 73. When the elapsed time in each functional part counted by the timer 73 exceeds the setting time, the function restriction process part 71 of the operation part 50 changes the value of the function restriction judgment flag from "0" to "1" for the correspondence functional parts so as to restrict the functions again.

As described above, in the present embodiment, the following effects can be obtained.

(1) The function restriction release system is configured by the mobile terminal 110 and the multifunction device 11. The function restriction of the functional parts can be released by controlling the controller 112 of the mobile terminal 110 so that the user can use the functions of the desired functional parts. At this point, the user can confirm the candidate functions that can be selected as a function restriction release target (available additional functions) in the additional function selection screen G4 ((d) in FIG. 5) displayed in the display part 111. In addition, the function selection information that the user selected the desired functions among the candidate functions by controlling the controller 112 in the additional function selection screen G4 is received in the selection part 114, and after sending the received function selection information to the server 100, it is possible to receive the release code from the server 100. Thus, it is not necessary that the mobile terminal 110 receives extra information such as a release code other than the release code corresponding to the selected functions. Because of this, in the mobile terminal 110, the capacity of the data that is necessary to receive from the server 100 for the function restriction release can be minimized as small as possible.

(2) The Mac address (device-specific information) of the multifunction device 11 is sent to the server 100 so that the authentication of the multifunction device 100 is performed. The function restriction can be released only when the multifunction device 11 is the official device. Also, the timing for sending the MAC address to the server 11 is, at the time of the user registration which is before the timing for sending the additional function selection information so that the available additional functions (candidates for the function restriction release target) of the multifunction device 11 identified by the MAC address are known from the data base and the available additional functions can be properly notified to the user on the additional function selection screen G4.

(3) The candidates of the available additional functions are displayed as a list on the additional function selection screen G4 in the mobile terminal 110 so that the additional desired functions can be selected from the list. Also, the usable or unusable functions of the multifunction device can be known. The user can confirm what kind of functions can be added.

(4) The multifunction device 11 requests the authentication to the server 100 when the release code was received. When the server 100 received the authentication request, the authentication process (activation process) is performed by the judgment part 105. The function restriction release process is performed only when the authentication was accepted, and the function restriction of the function realization part can be released only when the multifunction device 11 was an official multifunction device which is registered in the server 100.

(5) The software part of the function realization part is not only restricted based on the program but also the power supply to the hardware part is restricted so that it has a configuration that the function of the hardware part is also restricted. Because of this, for the function realization part in which the function is restricted, the power is not supplied to the hardware part so that it contributes to the reduction of the power consumption.

(6) A fee in each function is displayed in the additional function selection screen G4 so that it can be determined whether or not the function is added based on the fee.

(7) During the setting time which counts from the time of the power activation or the time of the predetermined operation, the mobile terminal 110 which exists in a predetermined range is searched so that the automatic communication can be established with the mobile terminal 110. Because of this, the user does not have to perform the complicated operation to establish the communication between the mobile terminal 110 and the multifunction device 11. Also, in the terminal search process, the operation part 50 of the multifunction device 11 reduces the output of the radio wave of the wireless communication part 37 and the possible wireless communicable area is limited in a predetermined range (e.g., within 1 meter in radius) from the multifunction device 11 so that when the user locates the mobile terminal 110 closer to the multifunction device 11, the communication between the mobile terminal 110 and the multifunction device 11 can be established.

(8) When the communication was established with the mobile terminal 110 at the first time after the power was activated, the multifunction device 11 acquires and stores the MAC address (identification information) of the mobile terminal 110. After that, when the multifunction device 11 received the release code, the MAC address acquired from the mobile terminal 110, which is the original sender of the release code, and the MAC address of the mobile terminal 110 acquired when the communication was established at the first time are compared so that the authentication process of the mobile terminal 110 is performed. Because of this, if the release code was received from a mobile terminal of a user other than the official user and there was a possibility of the illegal use, the function restriction release can not be accepted so that it can avoid the illegal use of the multifunction device 11.

(9) The print operation, which is the print instruction from the mobile terminal 110, for the screen G6 displayed when the release code was received from the server 100 is performed so that the release code can be sent to the multifunction device 11. Because of this, without providing a special structure for sending the release code such as a special send button, the release code can be sent to the multifunction device 11 from the mobile terminal 110 by using the existing operation functions.

Figure 7:
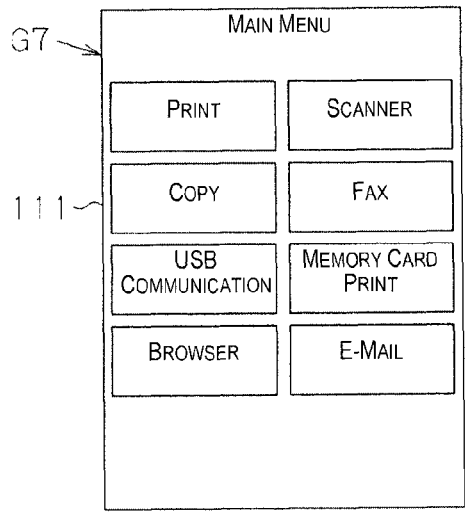
FIG. 7 is a schematic diagram showing a multifunction device operation screen of a mobile terminal.

(10) The software for the mobile terminal operation is downloaded so that the user can make an instruction for print, scan, copy, FAX, and the like by using the mobile terminal in a hand operation while watching the operation screen G7 (FIG. 7). Because of this, the user can use the favorite controller 112 of own mobile terminal 110 so that it is very easy to make an instruction for the multifunction device 11.

(11) The function restriction release for a function realization part (addition) can be individually performed in each function so that the user can release the function restriction by selecting a necessary function. Because of this, even though an additional usage fee of a function is generated, the fee payment can be minimized as much as possible.

(12) The elapsed time is counted by the timer 73 from when the function restriction was released. When the elapsed time reaches the setting time, the functions of the function realization parts, in which the restriction was released, are restricted again. Because of this, the user can temporary use the functions of the multifunction device 11 when it is necessary. For example, when the user visits hotels or community facilities temporary, the restriction of the functions of the multifunction device 11 is temporary released so that the necessary functions can be used. The functions are temporary released so that the usage fees can be further minimized.

Second Embodiment

Figure 12:
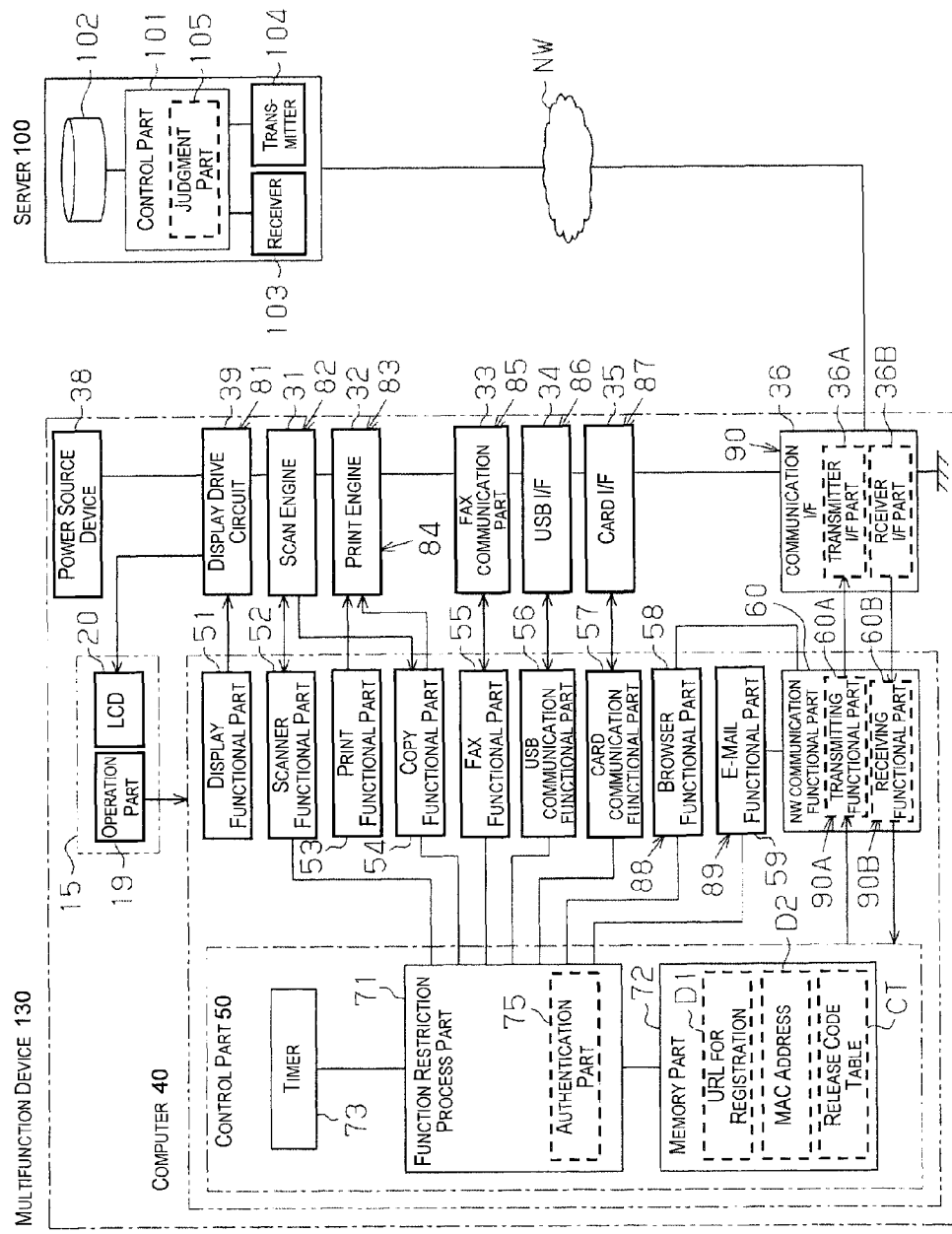
FIG. 12 is a block diagram showing a functional configuration of a multifunction device according to the second embodiment.

Next, the second embodiment will be explained. In the second embodiment, the function restriction release system is configured as a single multifunction device. As shown in FIG. 12, the multifunction device 130 as an example of the electronic apparatus has the same configuration of the multifunction device 11 of the first embodiment. In the multifunction device 130 as shown in FIG. 12, the wireless communication part 37 and the wireless communication functional part 61 as shown in FIG. 4 are omitted, but the multifunction device 130 also has these parts in the same manner as the first embodiment. In this embodiment, the function restriction release system can be a single multifunction device 130 so that the multifunction device 11 performs the processes which were in charge of the mobile terminal 110 of the first embodiment.

Because of this, an example of the selection part is configured by the controller 19 of the multifunction device 130 and an example of the display part is configured by the LCD 20 of the multifunction device 130. Also, the communication I/F 36 of the multifunction device 11 includes a transmitter interface part (hereinafter referred to as "transmitter I/F part 36A") and a receiver interface part (hereinafter referred to as "receiver I/F part 36B"). Also, a network communication functional part 60 includes a transmitting functional part 60A and a receiving functional part 60. A network communication function realization part 90 configured by the network communication functional part 60 and the communication I/F 36 includes a transmitting function realization part 90A configured by the transmitting functional part 60A and the transmitter I/F part 36A and a receiving function realization part 90B configured by the receiving functional part 60B and the receiver I/F part 36B.

The transmitting function realization part 90A sends the various data, which should be sent from the operation part 50 to the server 100, to the server 100 through the internet NW. Also, the operation part 50 receives various data from the server 100, and the receiving function realization part 90B receives the various data from the server 100 through the internet NW. By the way, in the present embodiment, an example of the transmitter is configured by the transmitting function realization part 90A and an example of the receiver is configured by the receiving function realization part 90B.

Because of this, the transmitting function realization part 90A sends the additional function selection information (function selection information) acquired and received by the controller 19 (selection part) and the MAC address (device-specific information) of the multifunction device 11 to the server 100. The receiving function realization part 90B receives the release code, which is releasable for the function restriction of the function for the function restriction release target identified from the function selection information in the electronic apparatus corresponding to the device-specific information, from the server 100.

The respective screens G1 to G6 as shown in FIGS. 5(a) to 5(f) are displayed in the LCD 20 of the multifunction device 11. The user controls the controller 19 by watching the respective screens G1 to G6 so that the user accesses a designated URL and selects an available additional function. Specifically, the communication processes performed between the mobile terminal 110 and the server 100 in the first embodiment is performed between the multifunction device 11 and the server 100 in the present embodiment. However, when the multifunction device 11 sends a MAC address to the server 100, a release code is also sent so that the server 100 performs the authentication process based on a hash value determined by the MAC address and the release code. After the authentication, an authentication request is not performed when the multifunction device 11 receives the release code from the server 100

According to the second embodiment as described above, the following effects can be obtained.

(13) By using the LCD 20, the controller 19, the transmitting function realization part 90A, the receiving function realization part 90B and the operation part 50 equipped in the multifunction device 11, the function restriction release process is performed in a communication between the multifunction device 11 and the server 100 through the internet NW. Because of this, the MAC address (device-specific information) of the multifunction device 11 in the user registration screen G2 (see FIG. 5(b)) is sent to the server 100 through the internet NW by the transmitting function realization part 90A. Also, the additional function selection screen G4 (see FIG. 5(d)) showing a list of the available additional functions is displayed in the LCD 20 of the multifunction device 11. When the user controls the controller 19 and the selection of the functions of the additional target is received, the additional function selection information is sent from the transmitting function realization part 90A of the multifunction device 11 to the server 100. And, when the receiving function realization part 90B of the multifunction device 11 receives a release code from the server 100, the function restriction of the functional parts of the additional function target is released based on the release code by the operation part 50. Thus, without using the mobile terminal 110, the function restriction of the functional parts selected in the multifunction device 11 can be released.

By the way, the above embodiment can be changed to the following configuration.

In the above respective embodiments, the printing functional part 53 is added as a functional part of a function restriction release target candidate so that the printing function is restricted, and when the user desires it, the restriction of the printing function can be released. Also, the display function realization part 81 is added as a functional part of a function restriction release target candidate so that the display function is restricted, and when the user desires it, the restriction of the display function is released. In addition, in a case that at least one of respective functions of the network communication and the wireless communication is not used for the function restriction release process, at least one of the network communication function realization part 90 and the wireless communication function realization part 91 corresponding to the at least one of the functions which is not used can be a functional part of a function restriction release target candidate. For example, in the first embodiment, in a case of the function restriction release process in which a communication between the multifunction device 11 and the server 100 is not used, the network communication realization part 90 can be a function restriction release target candidate.

A configuration that the function restriction of a functional part is temporary released can be modified to a configuration that when the function restriction of a purchased functional part is released, once, the released function is not restricted again. Specifically, it can be a configuration that when the user purchases a license key (a release code), the function restriction of the functional part is released and the function is added. Also, it can be a configuration that the user can choose either one of a rental release key which temporary releases a function of a functional part, or a license key which permanently releases a function of a functional part.

As one example of the device-specific information, the MAC address of the multifunction device (electronic apparatus) is adapted, but it can be an IP address if it is uniquely identifiable for the multifunction device.

A timing for the authentication process of the multifunction device 11 (electronic apparatus) by the server 100 can be appropriately changed. A configuration that the authentication process (S24) is performed at a timing of the next process of the user registration can be modified to a configuration that the authentication process of the multifunction device 11 is performed after a timing of receiving the additional function selection information (S28).

The MAC address of the multifunction device as one example of the device-specific information is sent as a registration information at the time of the user registration. This can be modified so that the MAC address can be sent at the same time that the additional function selection information is sent, or the MAC address can be sent after the additional function selection information was sent.

A method for sending a release code to the multifunction device 11 from the mobile terminal 110 by a print control to print the screen G6 can be modified so that for example, it can be a method that a send button provided in the screen G6 is controlled.

The respective functional parts of the computer 40 in FIG. 4 were realized by mainly, the software so as to execute the programs by the CPU, but it can be realized by hardware, or it can be realized by both software and hardware.

A power is supplied to the hardware parts corresponding to all of the functional parts of the function restriction release target candidates (e.g., a drive circuit and an actuator) so that it can be a configuration that the function restriction of the hardware parts is not performed.

A configuration that the display part, the selection part, the transmitter and the receiver are equipped in the mobile terminal is not limited so that it is satisfied if the display part, the selection part, the transmitter and the receiver are respectively equipped in the electronic apparatus or the mobile terminal. For example, it can be a configuration that the display part, the selection part, and the transmitter are equipped in the mobile terminal, and the receiver is equipped in the electronic apparatus. To the contrary, it can be a configuration that the display part, the selection part, and the transmitter are equipped in the electronic apparatus, and the receiver is equipped in the mobile terminal. Also, for example, it has a configuration that the display part and the selection part are equipped in the mobile terminal and the transmitter and the receiver are equipped in the electronic apparatus. To the contrary, it can be a configuration that the display part and the selection part are equipped in the electronic apparatus and the transmitter and the receiver are equipped in the mobile terminal. In addition, for example, it has a configuration that the display part, the selection part, and the receiver are equipped in the mobile terminal, and the transmitter is equipped in the electronic apparatus. To the contrary, it can be a configuration that the display part, the selection part, and the receiver are equipped in the electronic apparatus, and the transmitter is equipped in the mobile terminal. In this case, when selecting in the selection part, at least selection information is wirelessly sent to the other side between the electronic apparatus and the mobile terminal and the selection information and the device-specific information are sent to the server from the other side. Also, for example, it has a configuration that the display part and the receiver are equipped in the mobile terminal, and the selection part and the transmitter are equipped in the electronic apparatus. To the contrary, it can be a configuration that the display part and the receiver are equipped in the electronic apparatus, and the selection part and the transmitter are equipped in the mobile terminal. Obviously, other combinations can be adapted.

In the embodiment described above, a part of the functional parts among a plurality of functional parts is restricted, but for example, it can be a configuration that all of the plurality of functional parts are restricted, and among them, the restriction of a desired function part can be released. Also, in the multifunction device that includes at least two functional parts of the scanner functional part 52, the print functional part 53, the copy functional part 54, and the facsimile functional part 55, at least one of the functional parts is restricted as a candidate of the function restriction release target in the initial state, and at least one of the candidates of the function restriction release target can be selected to release the function restriction. For example, it can be a configuration that a functional part in which the function restriction can be released is more than 2, or it can be a configuration that a functional part in which the function restriction can be released is only 1.

The electronic apparatus is not limited to the multifunction device, so that it can be a printer that does not have a scanner function and a copy function and has a print function. Also, the recording method of the print engine in the electronic apparatus (printing device (including a multifunction device)) having a print function can be adapted to any recording method of an inkjet recording method, a dot impact recording method, and a laser recording method. Also, the printing device can be a serial printer, a lateral type printer, a line printer, and a page printer. Further, the electronic apparatus is not limited to the printing device, so that for example, it can be a scanner, a facsimile device, and a copy machine. In addition, the electronic apparatus can be a projector, a photo display device (digital photo frame), a digital camera, video camera, and a mobile phone.

What is claimed is:

1. A function restriction release system of an electronic apparatus comprising:
   an electronic apparatus having a plurality of functional parts that includes at least two of a scanner functional part, a print functional part, a copy functional part and a facsimile functional part, the electrical apparatus further having a function restriction information indicative of function restriction of each of the functional parts, the function restriction information indicating that an execution of at least one of the functions of the functional parts is restricted as a default;
   a display part that displays candidates of functions that can be selected as a function restriction release target among the functions;
   a selection part that receives a selection control for at least one of the functions in the candidates of the functions displayed in the display part, and acquires a function selection information;
   a transmitter that sends the function selection information acquired by the selection part and a device-specific information of the electronic apparatus to a server, with the function selection information that is sent for the first time including a download instruction for downloading a software to operate the electronic apparatus;
   a receiver that receives a release code, which is releasable for the function restriction of the functional parts of the function restriction release target identified from the function selection information in the electronic apparatus corresponding to the device-specific information, from the server;

an operation part that temporarily releases the function restriction of the functional parts of the function restriction release target based on the release code that has been received by the receiver from the server; and a mobile terminal which is capable of wireless communication with the electronic apparatus, each of the display part, the selection part, the transmitter, and the receiver being equipped in the electronic apparatus or the mobile terminal, the electronic apparatus including a wireless communication part which is capable of wireless communication with the mobile terminal, the operation part controlling the wireless communication part to limit a possible communication area in a predetermined range from the electronic apparatus and wirelessly searching the mobile terminal existed in the predetermined range, the operation part reducing radio wave intensity of the wireless communication part while wirelessly searching the mobile terminal with respect to radio wave intensity of the wireless communication part while not searching the mobile terminal, and the operation part notifying an address of the server that should be accessed to the searched mobile terminal.

2. The function restriction release system of the electronic apparatus according to claim 1, wherein the operation part sends the device-specific information to the searched mobile terminal wirelessly in the wireless communication part, the mobile terminal includes at least the display part, the selection part and the transmitter, and the transmitter of the mobile terminal sends the function selection information and the device-specific information to the server.

3. The function restriction release system of the electronic apparatus according to claim 1, wherein the function restriction release system is composed of the electronic apparatus, and the display part, the selection part, the transmitter, the receiver, and the operation part are equipped in the electronic apparatus.

4. The function restriction release system of the electronic apparatus according to claim 1, wherein the functional parts of the candidates are composed of a software part, a hardware part is connected to the functional parts to be realized, a function of the hardware part is restricted by interrupting a power supply from a power source part, and the functions of the functional parts are restricted based on a program, and the operation part releases the function restriction of the functional parts of the function restriction release target based on the program, and also releases the function restriction of the hardware part corresponding to the functional parts by controlling the power source part to supply the power.

5. The function restriction release system of the electronic apparatus according to claim 1, wherein the operation part restricts the functions of the functional parts again when a setting time, which is counted from when the function restriction of the functional parts was released, is elapsed.

6. The function restriction release system of the electronic apparatus according to claim 1, wherein a payment screen, which requests a fee payment for releasing the restriction of the functional parts of the function restriction release target, is displayed in the display part by the server, and as a result of the payment process for the fee requested in the payment screen, the payment is sent from the transmitter to the server and when the server accepts the payment, the receiver receives the release code sent from the server which accepted the payment.

7. The function restriction release system of the electronic apparatus according to claim 1, wherein the selection part further receives a selection control for downloading the software to operate the electronic apparatus upon receiving the selection control for at least one of the functions.

8. A function restriction release system of an electronic apparatus comprising:

an electronic apparatus having a plurality of functional parts that includes at least two of a scanner functional part, a print functional part, a copy functional part and a facsimile functional part, the electrical apparatus further having a function restriction information indicative of function restriction of each of the functional parts, the function restriction information indicating that an execution of at least one of the functions of the functional parts is restricted as a default;

a display part that displays candidates of functions that can be selected as a function restriction release target among the functions;

a selection part that receives a selection control for at least one of the functions in the candidates of the functions displayed in the display part and acquires a function selection information;

a transmitter that sends the function selection information acquired by the selection part and a device-specific information of the electronic apparatus to a server, with the function selection information that is sent for the first time including a download instruction for downloading a software to operate the electronic apparatus;

a receiver that receives a release code, which is releasable for the function restriction of the functional parts of the function restriction release target identified from the function selection information in the electronic apparatus corresponding to the device-specific information, from the server;

an operation part that releases the function restriction of the functional parts of the function restriction release target based on the release code that has been received by the receiver from the server;

a mobile terminal which is capable of wireless communication with the electronic apparatus; and the server, the server including a server receiver that receives the function selection information and the device-specific information, a judgment part that judges whether or not the electronic apparatus is a device, in which the function restriction of the functional parts can be released, based on the device-specific information, and a server transmitter that sends the release code, which is releasable for the function restriction of the functional parts of the function restriction release target identified by the function selection information when the judgment was made that the electronic apparatus is the device in which the function restriction can be released, each of the display part, the selection part, the transmitter, and the receiver being equipped in the electronic apparatus or the mobile terminal, the electronic apparatus including a wireless communication part which is capable of wireless communication with the mobile terminal, the operation part controlling the wireless communication part to limit a possible communication area in a predetermined range from the electronic apparatus and wirelessly searching the mobile terminal existed in the predetermined range, the operation part reducing radio wave intensity of the wireless communication part while wirelessly searching the mobile terminal with respect to radio wave intensity of the wireless communication part while not searching the mobile terminal, and the operation part notifying an address of the server that should be accessed to the searched mobile terminal.

9. The function restriction release system of the electronic apparatus according to claim 8, wherein the selection part further receives a selection control for downloading the software to operate the electronic apparatus upon receiving the selection control for at least one of the functions.

10. An electronic apparatus comprising:

a plurality of functional parts that includes at least two of a scanner functional part, a print functional part, a copy functional part and a facsimile functional part;

a memory part that stores a device-specific information of the electronic apparatus, and a function restriction information indicative of function restriction of each of the functional parts, the function restriction information indicating that an execution of at least one of the functions of the functional parts is restricted as a default;

a receiver that receives a release code issued for releasing a function restriction of functions selected in the functions when a judgment was made that the electronic apparatus is a device, in which the function restriction of the functional parts can be released, based on the device-specific information;

an operation part that temporarily releases the function restriction of the functional parts based on the release code that has been received by the receiver; and a wireless communication part which is capable of wireless communication with a mobile terminal which is capable of wireless communication with the electronic apparatus, the operation part controlling the wireless communication part to limit a possible communication area in a predetermined range from the electronic apparatus and wirelessly searching the mobile terminal existed in the predetermined range, the operation part temporarily reducing radio wave intensity of the wireless communication part while wirelessly searching the mobile terminal with respect to radio wave intensity of the wireless communication part that is used while wirelessly communicating with the mobile terminal other than searching the mobile terminal, and the operation part notifying an address of a server that should be accessed to the searched mobile terminal.

\* \* \* \* \*